(12) United States Patent
Collier et al.

(10) Patent No.: US 10,167,107 B2
(45) Date of Patent: *Jan. 1, 2019

(54) CONTAINER OR SET OF CONTAINERS

(71) Applicant: KRAFT FOODS R&D, INC., Deerfield, IL (US)

(72) Inventors: Paul Collier, Redditch (GB); Peter MacQueen, Sheffield (GB)

(73) Assignee: KRAFT FOODS R&D, INC., Deerfield, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/900,215

(22) Filed: Feb. 20, 2018

(65) Prior Publication Data

US 2018/0170609 A1 Jun. 21, 2018

Related U.S. Application Data

(63) Continuation of application No. 14/903,502, filed as application No. PCT/IB2014/001858 on Aug. 28, 2014, now Pat. No. 9,932,141.

(30) Foreign Application Priority Data

Aug. 30, 2013 (GB) .................................. 1315507.2

(51) Int. Cl.
*B65D 5/52* (2006.01)
*B65D 5/00* (2006.01)
(Continued)

(52) U.S. Cl.
CPC .............. *B65D 5/52* (2013.01); *B65D 5/001* (2013.01); *B65D 5/5233* (2013.01); *B65D 5/64* (2013.01); *B65G 57/165* (2013.01)

(58) Field of Classification Search
CPC ........ B65D 5/00; B65D 5/001; B65D 5/0015; B65D 5/002; B65D 5/52; B65D 5/5206;
(Continued)

(56) References Cited

U.S. PATENT DOCUMENTS

| | | |
|---|---|---|
| 5,894,933 A | 4/1999 | Crews et al. |
| 6,837,378 B2 | 1/2005 | Mason et al. |
| 7,597,241 B2 | 10/2009 | Valenzuela et al. |
| 7,677,434 B2 | 3/2010 | Fry |

(Continued)

FOREIGN PATENT DOCUMENTS

| | | |
|---|---|---|
| DE | 4003104 A1 | 8/1991 |
| DE | 10303556 A1 | 8/2004 |
| WO | 2011032735 A1 | 3/2011 |

OTHER PUBLICATIONS

Corrected Notice of Allowance; U.S. Appl. No. 14/903,502; filed Jan. 7, 2016; Container and Method of Manufacture; Notification Date: Nov. 29, 2017; 2 Pages.

(Continued)

*Primary Examiner* — Bryon Gehman
(74) *Attorney, Agent, or Firm* — Cantor Colburn LLP

(57) ABSTRACT

The invention provides a container comprising a base for storing and displaying one or more items, and a cover, wherein the container is configurable between a closed position in which the base is covered by the cover and an open position in which at least one item is visible and removable from the base, in use, and wherein at least one of the cover and the base comprises an attachment point or area on a surface thereof, for connecting a base or cover of a second container to the cover or base, in use.

4 Claims, 19 Drawing Sheets

(51) Int. Cl.
*B65D 5/64* (2006.01)
*B65G 57/16* (2006.01)

(58) Field of Classification Search
CPC .......... B65D 5/5233; B65D 5/54; B65D 5/64; B65D 21/00; B65D 21/02; B65G 7/16; B65G 7/165; B65G 57/16; B65G 57/165
USPC ....... 206/501–519, 736, 738, 745, 750, 751, 206/774
See application file for complete search history.

(56) References Cited

U.S. PATENT DOCUMENTS

| | | |
|---|---|---|
| 8,038,017 B2 | 10/2011 | Close |
| 9,010,621 B2 | 4/2015 | Baker et al. |
| 9,440,764 B2 | 9/2016 | Decello et al. |
| 2009/0314661 A1 | 12/2009 | Fisher et al. |
| 2016/0176570 A1 | 6/2016 | Collier et al. |

OTHER PUBLICATIONS

International Search Report; International Application No. PCT/IB2014/001858; International Filing Date: Aug. 28, 2014; dated Mar. 19, 2015; 7 Pages.
Non-Final Office Action; U.S. Appl. No. 14/903,502, filed Jan. 7, 2016; Container and Method of Manufacture; dated Jun. 1, 2017; 16 Pages.
Notice of Allowance; U.S. Appl. No. 14/903,502, filed Jan. 7, 2016; Container and Method of Manufacture; dated Nov. 20, 2017; 11 Pages.
Notification of the Second Office Action; Chinese Application No. 201480046263.4; dated Nov. 15, 2017; 12 Pages.
Requirement for Restriction/Election; U.S. Appl. No. 14/903,502, filed Jan. 7, 2016; Container and Method of Manufacture; dated Mar. 9, 2017; 8 Pages.
Written Opinion of the International Searching Authority; International Application No. PCT/IB2014/001858; International Filing Date: Aug. 28, 2014; dated Mar. 19, 2015; 8 Pages.

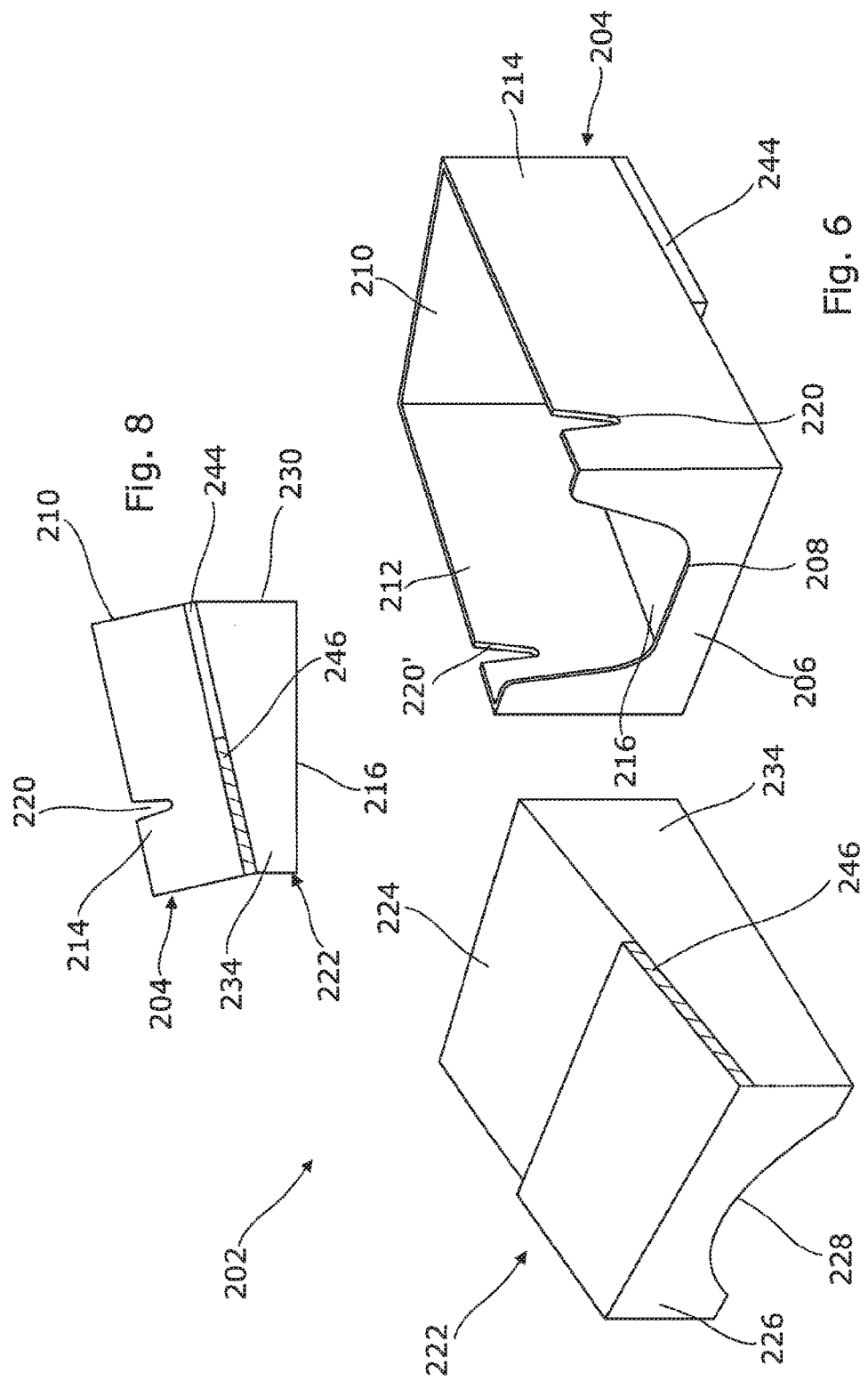

CONTAINER OR SET OF CONTAINERS

CROSS-REFERENCE TO RELATED APPLICATIONS

This application is a continuation of U.S. application Ser. No. 14/903,502, filed Jan. 7, 2016, which is a 371 of International Application No. PCT/IB2014/001858, filed Aug. 28, 2014, which claims priority to Great Britain Application No. 1315507.2, filed Aug. 30, 2013, both of which are hereby incorporated by reference in its entirety.

TECHNICAL FIELD

This disclosure relates to containers, in particular to containers having bases and covers which can be stacked on top of one another to display items within the base. The disclosure also relates to displays including stackable containers and methods of stacking containers to display items located therein.

BACKGROUND

It is desirable to store items, such as packaged food items in outer containers known as "shelf-ready packaging" ("SRP") which consists of a base for storing the items, and a cover or lid which can be removed, and the base located on a retail shelf or stand, to display the now visible items. A common form of shelf-ready packaging is formed of an integral base and cover, separable by a line of perforations extending therebetween. In use items are deposited through an opening in the base or cover, which is then sealed, and the sealed container transported ready for use. When it is desired to display the items, an operator removes the cover by tearing the cover away from the base at the line of perforations. The lid is generally discarded and the base placed on a shelf. This format is generally wasteful of material and the base and products are not displayed at an optimal viewing angle on a generally horizontal shelf.

In other known shelf-ready packaging the cover may be removed and upturned, then the base inserted into the upturned cover, to provide a durable stand, but again optimal viewing of the items within the base is not generally achieved.

In yet other known embodiments of shelf-ready packaging, the lid of a container may be removed from the base and inserted under the base to form a stand on which the base sits. In some examples of this type of SRP, the lid may include an inclined top surface between parallel walls, which forms an inclined surface on which the base sits, in order to display items within the base at a more effective angle to potential customers.

None of the prior art shelf-ready packaging enables vertical stacking of multiple containers of the same type, nor do they allow for display of different items in different bases in a vertical manner and in a manner in which all bases can be displayed for optimal viewing of the contents of each base by a potential customer.

It would therefore be advantageous to mitigate or overcome at least one of the problems of the prior art described above, or any other problem of vertical display of multiple shelf-ready packaging containers.

SUMMARY

According to a first aspect there is provided a container including a base for storing and displaying one or more items, and a cover, wherein the container is configurable between a closed position in which the base is covered by the cover, and an open position in which at least one item is visible and removable from the base, in use, and wherein at least one of the cover and the base includes an attachment point or area on a surface thereof, for detachably connecting a base or cover of a second container to the cover or base, in use.

The container of the first aspect therefore provides the ability for two or more containers to be stacked on top of each other in a stable configuration, whilst at least one item is visible and removable from each container.

The base may include a bottom, and one or more boundary walls such as front, rear and side walls, and may be of any suitable cross-sectional shape, such as square, rectangular, circular, oval, rectangular polygonal, triangular or the like, for example. The base may be formed from a single blank or a plurality of connected blanks.

The cover may include a top surface which may include one or more boundary walls pendent therefrom. The walls may include front, rear and side walls, which may correspond to the front, rear and side walls of the base. The walls of the cover may overhang the walls of the base, in use, when the cover is in the closed position. The front wall may be shorter that the rear wall, thus enabling the cover to be placed inclined with respect to an surface on which it is rested, in use.

In some embodiments at least one wall of the base include a cut-out portion or slot, arranged in use to receive at least one wall of the cover, when the cover is in the open position. In some embodiments opposite side walls of the base may include cut-out portions or slots, for receiving a wall, preferably the front wall, of the cover. In this way the cover may be lifted from the base, moved or slid backwards along the base and the wall of the cover may be at least partially slotted into the cut-outs or slots of the base, such that at least a portion of the interior of the base exposed, while the cover masks any remaining portion, and overhangs or protrudes from the base at the rear thereof.

A surface of the cover or base may include the attachment point or area for detachably connecting a base of a second container, in use. The surface may be an upper surface, which may include one or more protrusions extending upwardly or outwardly, against which a wall of the base may abut, in use. There may be protrusions extending from opposite edges of the upper surface of the cover or base, arranged to secure the second base therebetween. There may be further protrusions extending from one or more other edges. In some embodiments there may be a protrusion extending upwardly from the front or rear wall or vertex of the cover in addition to protrusions extending from opposite side walls or vertices. This configuration is especially useful if the top surface of the cover is inclined with respect to a surface on which it is rested, in use, thereby preventing a second base detachably connected to the cover from slipping off the cover.

The front wall of the base may include a cut-out portion, which may assist a user in removing an item therefrom, in use. The cover may include a front wall which overhangs and masks the cut-out portion of the base front wall, when the cover is in the closed position.

The upper surface of the cover may include substantially vertically pendent walls extending therefrom. The cover may include spaced apart and parallel side walls with a short end and a long end which creates an inclined upper surface with respect to the parallel side walls, and which upper surface is inclined when the side walls are rested on a surface, with respect to that surface.

In this way when a base is detachably connected to the upper surface of the cover, it may be inclined to ensure maximum visibility of the or each visible item therein.

In some embodiments the bottom of the base may include an attachment point or area in an alternative to, or additional to the attachment point or area of the cover. The attachment point or area of the bottom surface of the base may include one or more protrusions pendent therefrom, and may be as described for the protrusions of the cover or base hereinabove. The attachment point or area of the base and cover or the attachment point or area on the upper surface of a first base and the bottom surface of a second base may include two parts of a fastening element, arranged to detachably connect the base and cover, or a first base and second base, together and may include opposite parts of an inter-locking or abutting element. In some embodiments one of the base or cover may include a male attachment member or area and the other of the cover or base may include a female attachment member, which are arranged to interlock. The male member may be a tab or protrusion arranged to be inserted into a female member in the form of a slot or groove. In some embodiments there may be a plurality of male attachment members and a plurality of females attachment members.

According to a second aspect there is provided a container of the first aspect, including one or more items located in the base. There may be a plurality of items. The or each item may be a food product which may include its own secondary packaging. The food product may be a confectionery or bakery product, which may be selected from a chocolate product, chewing gum, biscuits, cookies, cakes, candy or the like, for example. In some embodiments the items are chocolate bars or tablets, boxes or cartons of chocolate products, packets of cookies or packets of chewing gum.

According to a third aspect there is provided a display including at least two containers including a base for locating items to be displayed and a cover, movable from a closed position to an open position in which at least one item is visible and removable from the base, the display including a base including a cover in the open position, and a second base mounted on a surface of the cover.

The containers may be as described for the first or second aspects.

There may be at least one further cover and base stacked on top of the second base.

Each container is therefore stacked with its cover in the open position, such that at least a portion of each base is visible and at least one item located in each base is visible and removable.

According to a fourth aspect there is provided a display including at least two containers including a base for locating at least one item there in, the base including an upper surface including at least a securement point or area for securing a further base on the surface, the display including a first base on which is secured a second base in a position on the upper surface such that at least one item is visible and removable from the first base beneath the second base.

Each container and base may be as described for the first or second aspects.

In some embodiments the second base is secured to the upper surface of the first base in an off-set position, such that at least a portion of the interior of first base is not covered by the second base, and in some embodiments the second base may extend from or overhang at least one side or wall of the first base.

There may be at least one further base stacked on top of the second base.

In the fourth aspect each container may include a base having an integral cover which is removed prior to stacking another base, the cover including at least a portion of the upper surface of the base, such that after removal of the cover, at least a portion of the upper surface remains, and a second base is securable thereto. The cover may also form part of at least one wall of the base, such as at least part of a front wall. In such an embodiment removal of the cover removes a portion of the (front) wall and upper surface, to expose any items located within the base, and enable viewing and removal by a user, when a second base is mounted on the upper surface.

The securement point or area may include protrusions extending from the upper surface which may include protruding flaps, bosses, tabs, lips or walls onto which, or between which the second base is secured. In some embodiments each base may include a second securement point or area, on a lower surface thereof such as a bottom surface, cooperable with the securement point or area of the upper surface. In this way the securement areas or points of the upper and lower surfaces may cooperate to secure a second base on the upper surface of the first base. The securement area or point of the lower surface may include a slot or aperture arranged to receive a corresponding protrusion of the upper surface of the first base, or vice versa.

The securement points or areas of the first and second bases may include two parts of a fastening element, arranged to detachably connect the bases together, and may include opposite parts of an inter-locking or abutting element.

The base of any of the aspects may include means to connect an item or items located therein in a desired position. There may be a protrusion extending into the base, arranged to present the or each item in an inclined orientation with respect to the bottom of the base. The base may include means to push the or each item towards an end of the base, such as the front wall. The pusher may include a resilient biasing means such as a spring, for example. In use the pusher may ensure that an item or items is always located in the portion of the interior of the base that is visible when the cover is in the open position.

The base and cover may be formed from cartonboard, plastics, metal or any combination thereof, for example.

According to a fifth aspect there is provided a method of stacking a plurality of containers each including a base for locating at least one item and a cover moveable between a closed position and an open position in which at least one item is visible and removable from the base, the method including the steps of:

a) providing at least two containers;
b) mounting a first base to a surface of a first cover; and either
c) mounting a second base to a surface of a second cover, followed by mounting the second cover in the open position on the first base; or
d) mounting a second cover in the open position on the first base and mounting a second base to an upper surface of the second cover.

Further containers may be stacked by separating or moving the covers and bases of said further containers and repeating steps c) or d) using the said further covers and bases.

The containers may be as described for the first or second aspects, and in some embodiments may include an attachment point or region on one or both of the cover and base, for detachably connecting the base and covers in use, as described above.

The bases may include one or more items located within the bases, which items may be as described hereinabove.

According to a sixth aspect there is provided a method of stacking a plurality of containers of the first or second aspect, including the steps of:
 a) providing at least first and second containers; and
 b) connecting the base of the second container on a surface of the cover of the first container in the open position;

The connection in step b), may be by way of appropriate attachment points or regions, such as protrusions, slots and cut-outs, as described hereinabove.

The method may include a step of moving the cover of the second container from the closed to the open position before or after step b).

The method may include the step of detaching the cover of the second container before or after step b) and optionally mounting the first base on the cover of the second container. In this way the first base may be mounted on a detached cover in order to ensure optimal display angle of the interior of the first base, and any further bases stacked thereon.

According to a seventh aspect there is provided a method of stacking a plurality of containers of the first or second aspects, including the steps of:
 a) providing at least two containers;
 b) stacking from bottom to top of the stack, at least a base, a cover in the open position and another base.

Step b) may include stacking, from bottom to top of the stack, at least a cover, a base, a cover in the open position and another base.

There may be a further sequential stacking of covers in the open position and bases, on top of the stack.

According to an eighth aspect there is provided a display of the third or fourth aspect provided by the methods of the fifth, sixth or seventh aspect.

The covers of the containers used in the methods of the fifth, sixth and seventh aspects may include a top surface including parallel pendent spaced apart walls having a shorter end and a longer end, thus ensuring a base attached on the top surface is inclined when a cover is used as the bottom component of a display. This configuration enables more effective display of items visible in the interior of the base.

According to an eighth aspect there is provided a method of creating a display of the fourth aspect, the method including the steps of:
 a) providing at least two containers described for the fourth aspect each including a base and a cover;
 b) removing the cover from the base of the first container;
 c) securing a second base to an upper surface of the first base by way of the or each securement point or area of the upper surface, and optionally
 d) removing the cover from the second base.

Step c) may include securing the second base in an off-set position with respect to the first base, such that the second base extends from or overhangs the first base.

The second base may include a securement point or area on a lower surface thereof, arranged to cooperate with the securement point of area of the upper surface of the first base, as described hereinabove.

BRIEF DESCRIPTION OF THE FIGURES

Embodiments of the various aspects will now be described by way of example only with reference to the accompanying Figures in which:

FIG. 6 is a perspective view of a base of a second embodiment of a container;

FIG. 7 is a perspective view of a cover of the second embodiment of a container;

FIG. 8 is a side view of the base and cover of the second embodiment shown in FIGS. 6 and 7 connected together;

DETAILED DESCRIPTION

Figure 1:
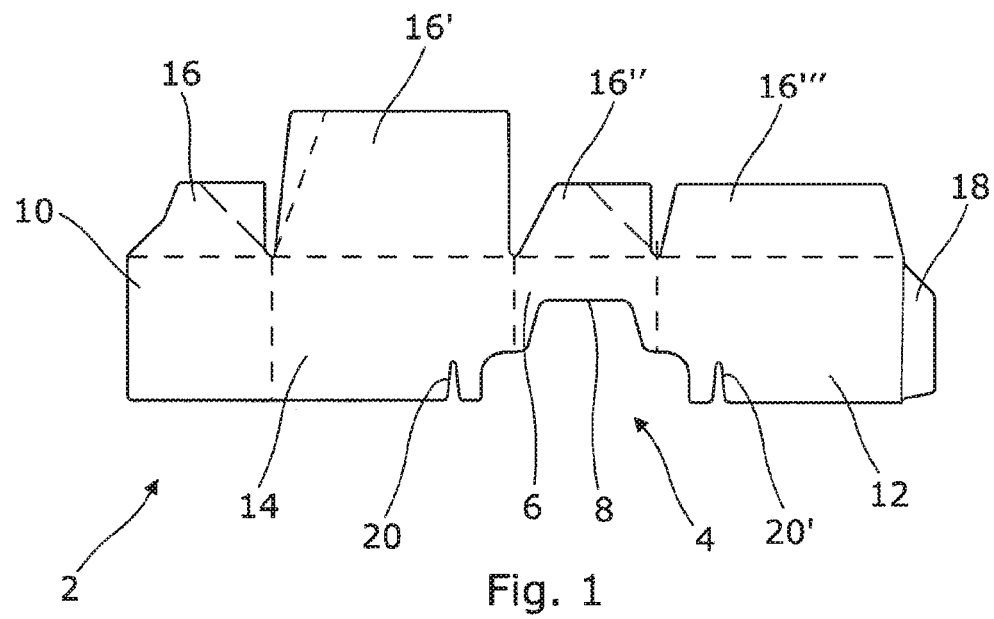
FIG. 1 is a packaging blank for a base of a first embodiment of a container.
Figure 2:
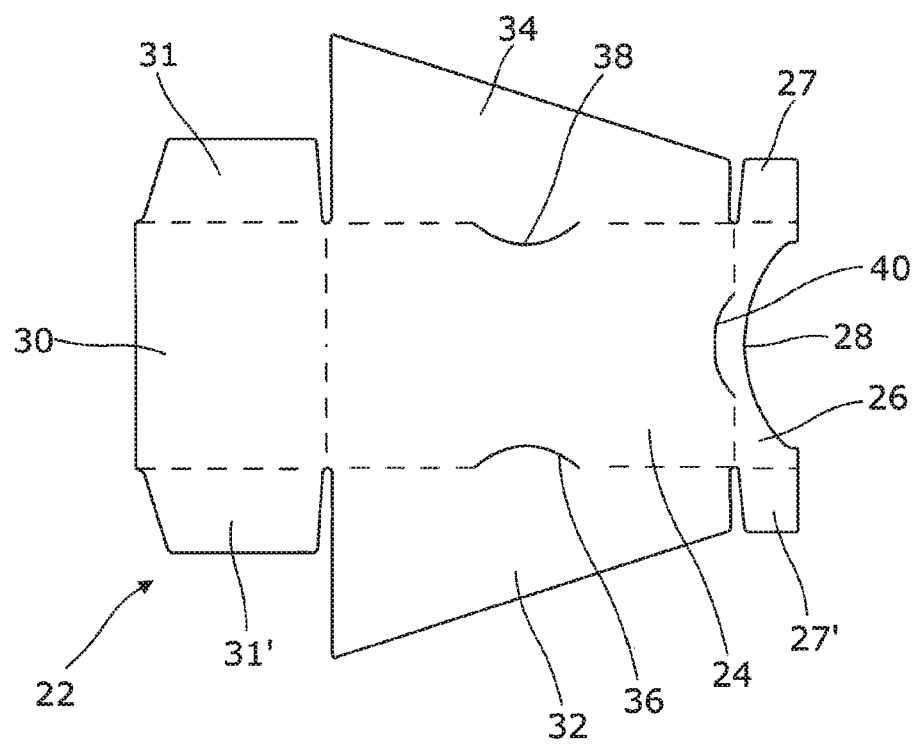
FIG. 2 is a packaging blank for a cover of the first embodiment of the container.
Figure 3:
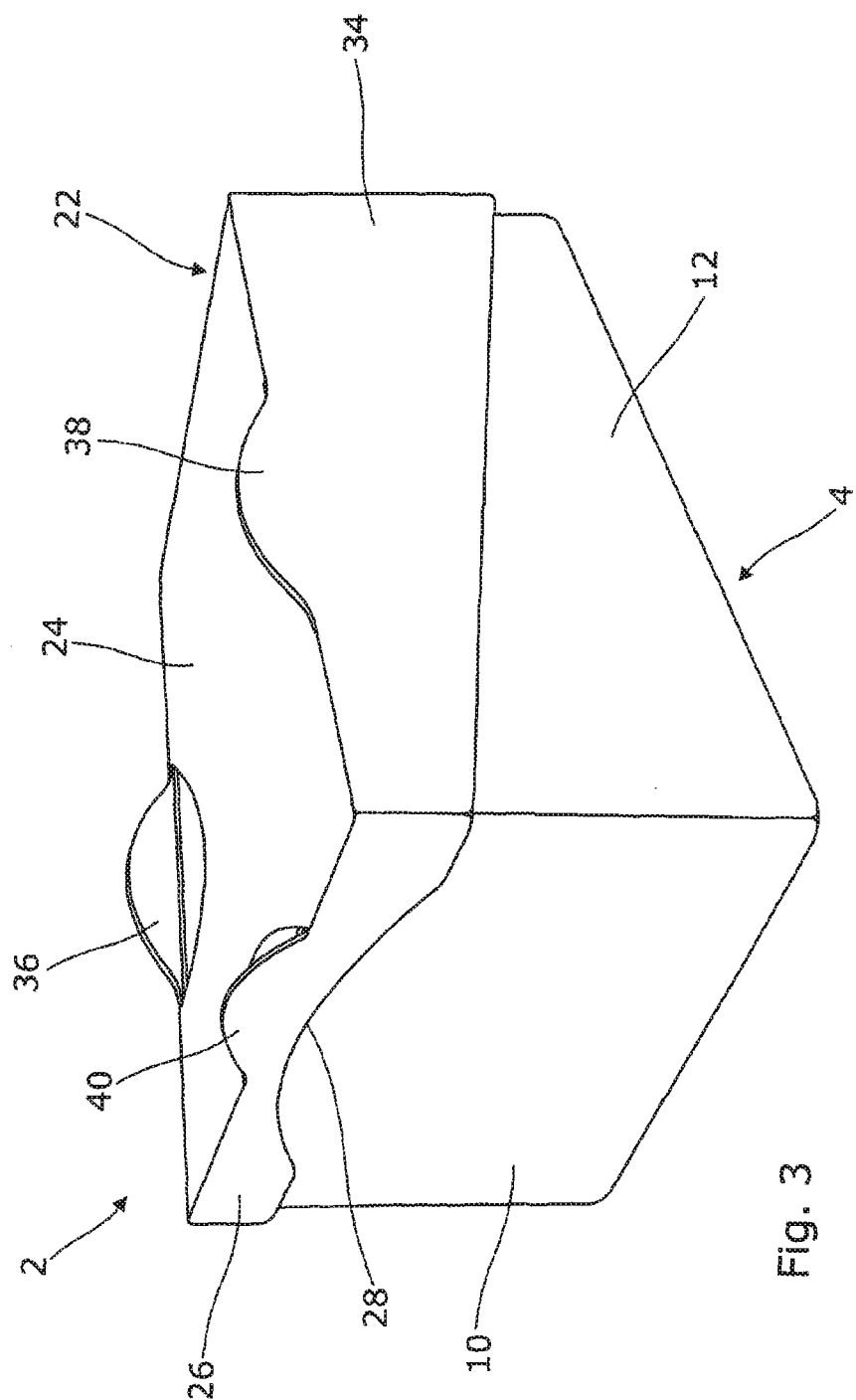
FIG. 3 shows the container of the first embodiment in a fully closed configuration.

Referring firstly to FIGS. 1 to 3 a first embodiment of a container (2) includes a base (4) and a cover (22). The base (4) includes a front wall (6), rear wall (10) and left and right side walls (12, 14). The cover (22) includes an upper surface (24) from which hang a front wall (26), rear wall (30) and left and right side walls (32 and 34). FIGS. 1 and 2 show the base (4) and cover (22) respectively as blanks, in an unfolded configuration, whereas the base (4) and cover (22) shown in FIG. 3 are in a fully folded configuration.

As shown in FIG. 1, the base (4) includes bottom wall flaps (16, 16', 16", 16'''), which together form a bottom wall of the base (4). The front wall (6) of the base (4) also includes a cut-out portion (8), which in use assists in enabling visibility and removal of items from within the base (4).

The base (4) includes a side flap (18) pending from the right wall (12), which is folded in use and adhered to the inside of the back wall (10) in order to retain the base (4) in its folded configuration.

The left and right side walls (12, 14) include cut-out slots (20, 20') extending from the upper edge thereof, approximately one third of the way back from the front wall (6).

Figure 4:
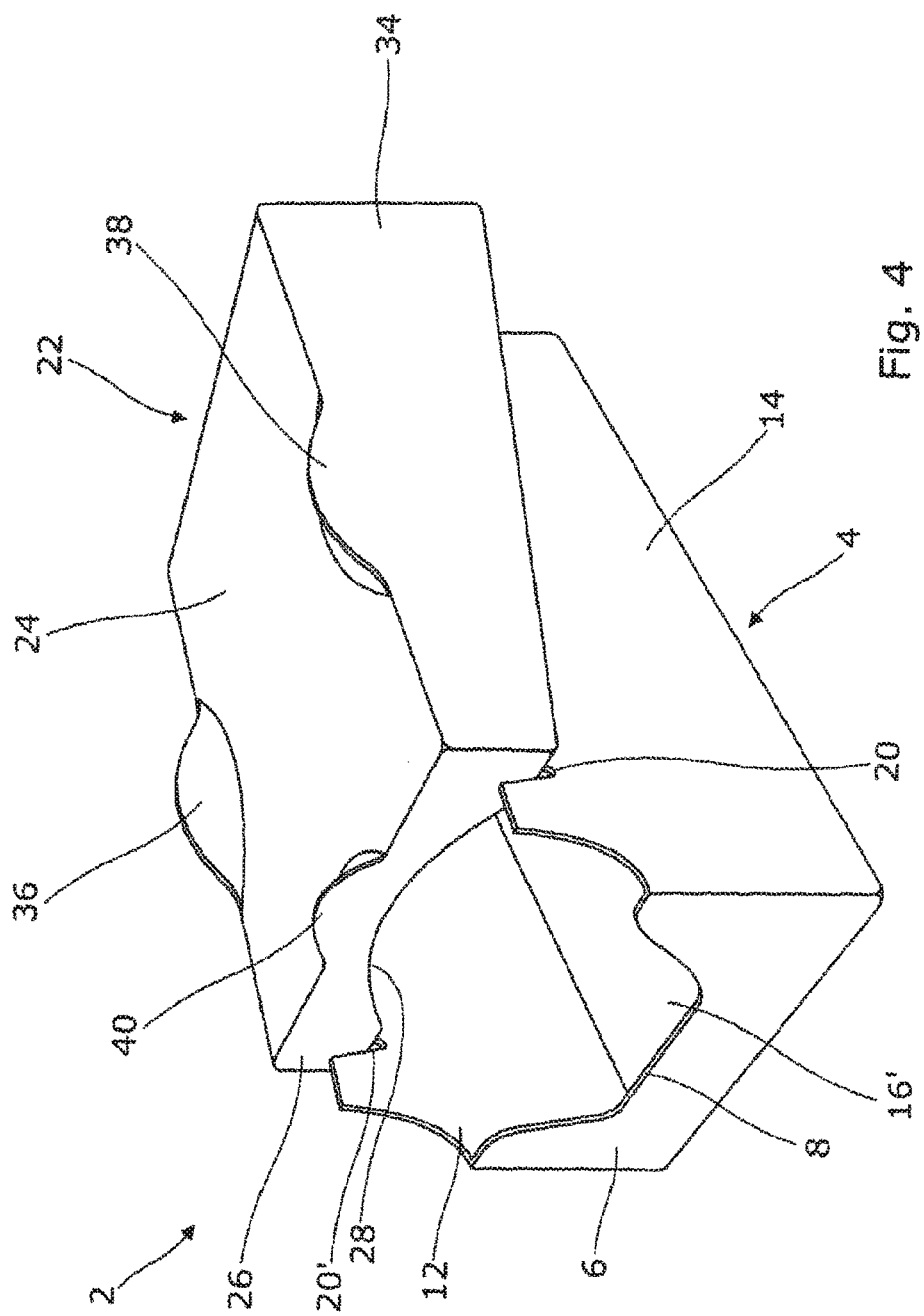
FIG. 4 shows the container of the first embodiment with a connected cover in the open position.

The blank of the base (4), in use is folded to form a generally tray-like base, as shown in FIGS. 3 and 4.

The cover (22) includes protruding flaps (36 and 38) which extend upwardly, in use, from the upper surface (24) at the vertices of the left and right side walls (32.34). The vertex between the upper surface (24) and the front wall (26) also includes a protruding flap (40), which is use extends upwardly from the vertex between the front wall (26) and upper surface (24). The flaps (36, 38 and 40) form attachment regions, for detachably connecting a base on the upper surface (24), and preventing slippage of said base from the upper surface (24), in use.

The front wall (26) and rear wall (30) of the cover (22) include side flaps (27, 27' and 31, 31') respectively, which in use are adhered to the inside of the left and right side walls (32, 34), in order to retain the cover in a folded configuration in use.

The blank of the cover (22), as shown in FIG. 2 is folded to produce the tray-like cover (22) as shown in FIGS. 3 and 4. The upper surface (24) of the cover (22) is slightly wider than the width of the front wall (6) and rear wall (10) of the base (4), so that in use, when the cover is placed on top of the base (4), the front wall (26), rear wall (30) and left and right side walls (32, 34) of the cover (22) hang down over the front wall (6), rear wall (10) and left and right side walls (12, 14) of the base (4), covering any items located within the base (4), in use. This configuration is shown in FIG. 3, and the cover is in a closed position.

Use of the container (2) formed by the blank base (4) and blank cover (22) will now be described with reference to FIGS. 3 to 5.

The base (4) and cover (22) are formed from their respective blanks shown in FIGS. 1 and 2. The base (4) is formed by folding the front wall (6), rear wall (10) and left and right side walls (12, 14) about their respective fold lines, and adhering the bottom wall flaps (16, 16', 16", 16''') together, in addition to adhering side wall flap (18) to the inside of the rear wall (10). This creates the tray like base shown in FIGS. 3 to 5.

Figure 5:
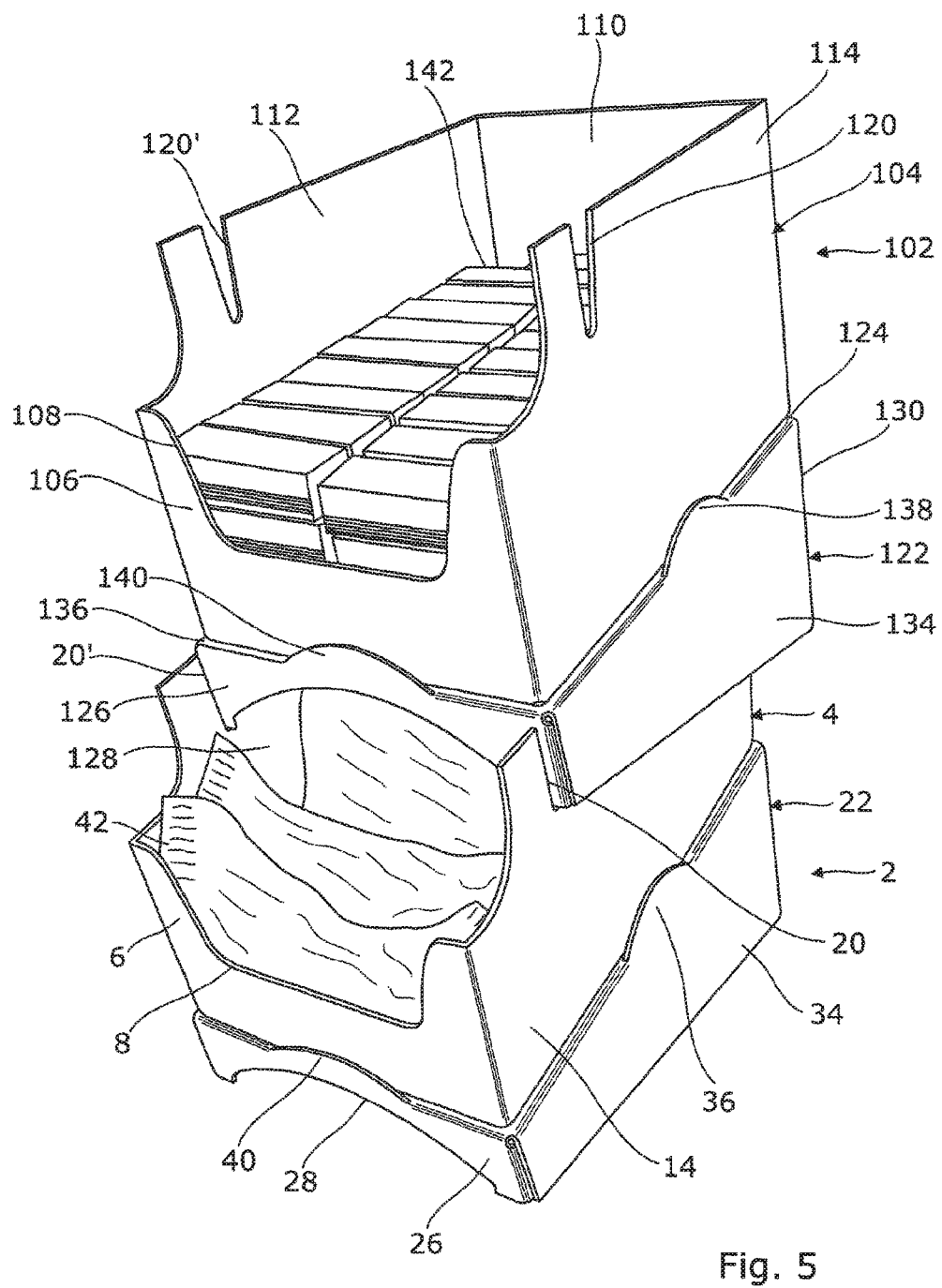
FIG. 5 is a perspective view of two bases and two covers of the container defined by the blanks of FIGS. 1 and 2 stacked vertically.
Figure 9:
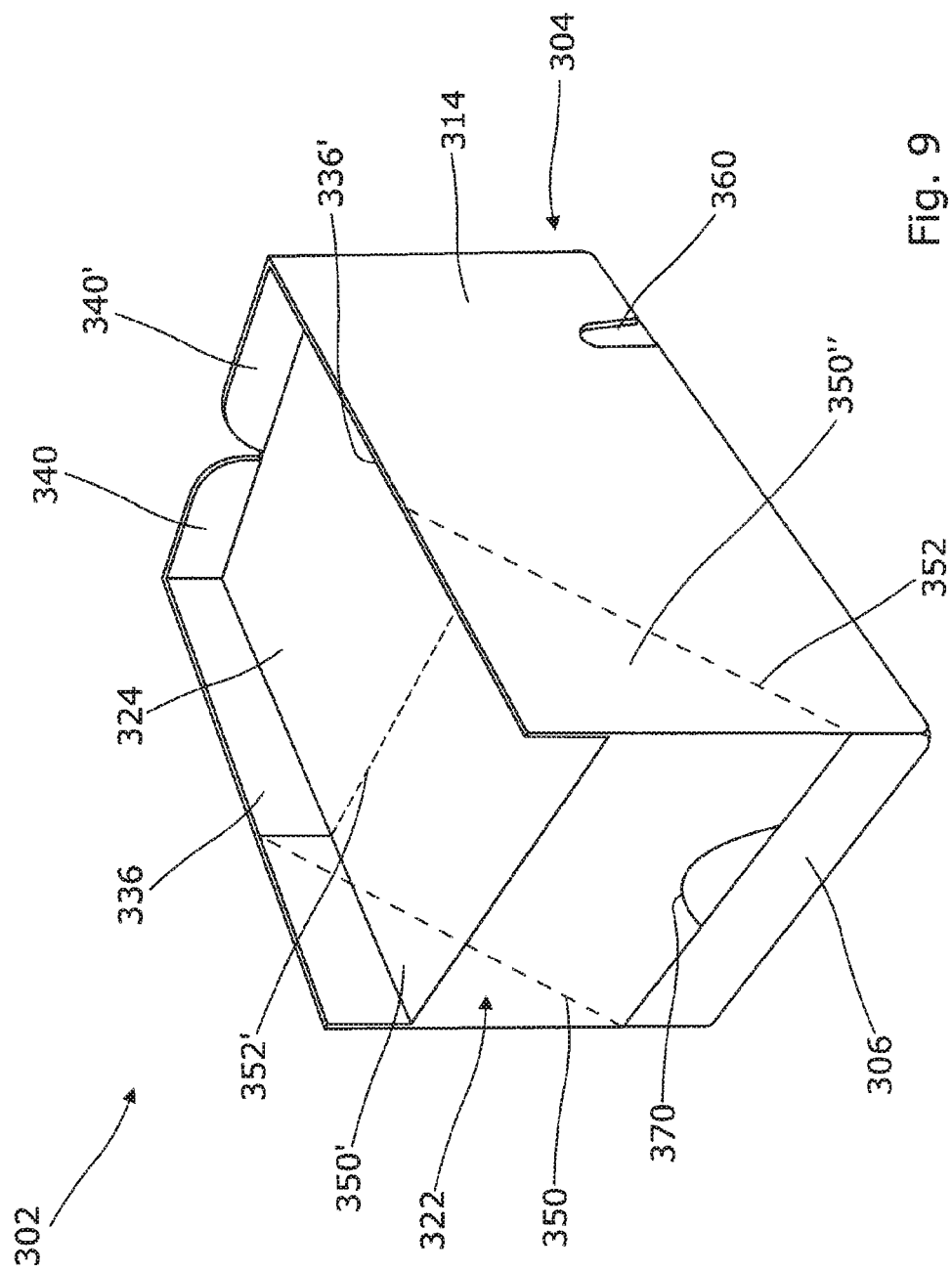
FIG. 9 is a perspective view of a third embodiment of a container in a closed configuration.

Likewise, the cover (22) is formed from the blank shown in FIG. 2 by folding the front wall (26) rear wall (30) and left and right side walls (32, 34) about their respective fold lines, then adhering the rear wall flaps (31, 31') and front wall flaps (27, 27') to the inside of the left and right side walls (32, 34), producing a tray like cover as shown in FIGS. 3 to 5.

In use, items such as food products may be placed in the interior of the base (4). As shown in FIG. 5, confectionery items (42) in secondary packaging are placed in the interior of the base (4) and the cover (22) is secured onto the base (4) in order to substantially completely cover the confectionery items (42). In this position, the cover is fully closed, and the container (2) is suitable for transport and storage to a desired location, such as a retail establishment.

When it is desired to display the items located within the base (4), the cover (22) may be removed to completely uncover the base (4), to display all of the items.

However, in many instances it is desired to display items from multiple bases of containers in a small space in a retail establishment, and in that case, the container (2) of the embodiment shown in FIGS. 1-5 can be used to form vertical stacks of displayed items as follows.

As shown in FIG. 4, firstly the cover (22) of a first container (2) can be moved from the fully closed position (shown in FIG. 3) to an open position (shown in FIG. 4), wherein the front wall (26) of the cover (22) is slotted into the cut-out slots (20, 20') of the base (4). This provides a configuration as shown in FIG. 4, in which items (42) located within the base (4) are visible and withdrawable by a potential buyer. The cut-out portion (8) of the base (4) and the cut-out portion (28) of the cover (22) increase the visible and open area from which an item (42) may be drawn. In some uses of the container (2), this open position is all that is required, and the container (2) can be placed on a retail shelf or other surface in order to present items (42) to a potential buyer.

Due to the configuration of the cover (22) having a shorter front wall (28) than rear wall (30), and the length of the slots (20, 20') on the front wall (6) of the base (4), the upper surface of the cover (24) lies parallel with the bottom wall (16, 16'. 16", 16''') of the base (4) in the open position.

In other embodiments, especially in retail environments with a small amount of space, or limited shelving, it is desirable to vertically stack products, in order to present the maximum number of items in a minimal area. In these environments, the container (2) can be combined with another container (102) as shown in FIG. 5. In this embodiment, the cover (22) of the container (2) is firstly fully separated from the base (4). The cover (22) is then placed on a surface, and the base (4) detachably connected to the upper surface (24) of the cover (22), such that the protruding flaps (36, 38 and 40) abut and contain the base (4). As the front wall (26) of the cover (22) is shorter than the rear wall (30), the upper surface (24) is presented at a downwardly slopping inclined angle respective to the surface on which it rests. This has the effect of inclining the base (4) at a downward angle, such the maximum visibility of items (42) within the base (4) is presented to a potential buyer. The cut-out flaps (36, 38 and 40) of the cover (22) prevent the base (4) from slipping downwardly and off the cover (22).

A second container (102) is then opened by separating the cover (122) from the base (104). The cover (122) is identical to the cover (22), and includes a front wall (126) side walls (134, 136) a rear wall (130) and an upper surface (124), from which upwardly extend flaps (136, 138 and 140). The front wall (126) includes a cut-out portion (128). The base (104) is identical to the base (4) and includes a front wall (106) rear wall (110) left and right side walls (112 and 114). The front wall (106) includes a cut-out portion (108), and the left and right side walls (112, 114) include cut-out slots (120, 120').

The second cover (122) is connected to the first base (4) such that the front wall (126) of the second cover (122) slots into the cut-out slots (20, 20') of the first base (4) and due to the configuration of the short front wall (126) and long rear wall (130), the upper surface (124) lies parallel with the bottom wall (16, 16', 16" and 16''') of the first base (4) and is thus at the same inclined angle Is this way, the first base (4) is in the open position, in which items (42) are visible and removable by a potential buyer, through the open space defined between the cut-out portion (8) of the base (4) and the cut-out portion (128) of the cover (122).

The second base (104) is then detachably connected to the upper surface (124) of the second cover (122) in the same manner as the base (4) is detachably connected to the upper surface of the cover (22). It is also at the same inclined angle as the base (4) and second cover (122). The second base (104) is prevented from slipping from the second cover (122) by abutment with the protruding flaps (136, 138 and 140). The base (4) does not include a cover located thereon, and therefore the items (142) within the base (104) are fully visible and removable by potential buyer.

It can be seen in the configuration shown in FIG. 5, items from multiple containers may be displayed together in a stacked vertical fashion, removing the need for individual floor or shelf space area for each base (104), whilst ensuring that items located within the bases are visible and removable in a convenient manner by potential buyers.

In an alternative embodiment to that shown in FIG. 5, the flaps (38, 40) of the first cover (22) and the flaps (136, 138 and 140) of the second cover (22) may be omitted, and the bases (4) and (104) detachably connected to the upper surfaces of the covers (22, 122) by friction alone. The weight of any items in the upper base may prevent the upper base from slipping down the inclined surface of the cover in the open position. In other embodiments, the protruding flaps of the covers may be replaced with any suitable connection means and/or the bottom walls of the bases may include slots into which the protruding flaps project, to securely connect the covers and bases together.

Turning now to FIGS. 6 to 8, in a second embodiment of a container (202) a base (204) includes a front wall (206) with a cut-out portion (208), a rear wall (210) left and right side walls (212, 214) and a bottom wall (216), defining a tray. The left and right side walls (212, 214) include cut-out slots (220, 220'). The base includes an area for detachably connecting the base (204) to a corresponding cover (222), in the form of flaps pendent therefrom, forming a generally rectangular box (244). A cover (222) includes a front wall (226) with a cut-out portion (228), a rear wall (210) and left and right side walls (234, 236) bounding an upper surface (224). On the upper surface (224) are flaps defining a generally rectangular box (246) which serve as the corresponding attachment region (244) of the base (204). The attachment region (246) of the cover (222) is located extending from the front wall (226) along the upper surface (224), to approximately half way along the upper surface (224). The attachment portion (224) of the base (204) extends from the rear wall (210) towards to front wall (206) approximately half the length of the bottom wall (216). In this way, when the base (204) is located on top of the upper surface (224) of the cover (222), the corresponding attachment portions (244) and (246) abut, forming two halves of a locking element in order to prevent the base (204) slipping from the upper surface (224) of the cover (222). Therefore, in this embodiment there are corresponding locking and mating attachment regions on both the base (204) and cover (222). Use of the embodiment shown in FIGS. 6-8 is substantially identical to that described from FIGS. 1-5, and further covers (222) and bases (204) may be stacked accordingly.

We refer now to FIGS. 9 to 12. In a third embodiment of a container (302) a base (304) includes a front wall (306) a rear wall (310) and left and right side walls (314, 312) and a bottom wall (316), defining a tray. The left and right side walls (312, 314) include cut-out slots (360, 360') at the base thereof. The cut-out slots (360, 360') form securement means for securing the base (304) to an upper surface of a second base, in use. The upper surface (324) of the base (304) includes upwardly extending peripheral flaps in the form of left (366) and right (336') side flaps, and a split rear wall flap (340, 340'), extending along the left, right and rear edges of the upper surface (324) respectively. The container (320) also includes a cover (322), integral with the base (304). The cover includes a front surface (350), upper surface (350') and left and right side surfaces (350" and 350'"). The cover (322) is integrally connected with the base (304) via perforations (352, 352'). The front wall (350) of the cover (322) includes a cut-out slot (370), arranged in use to provide an aperture for a user to insert his or her fingers, in order to remove the cover.

Figure 10:
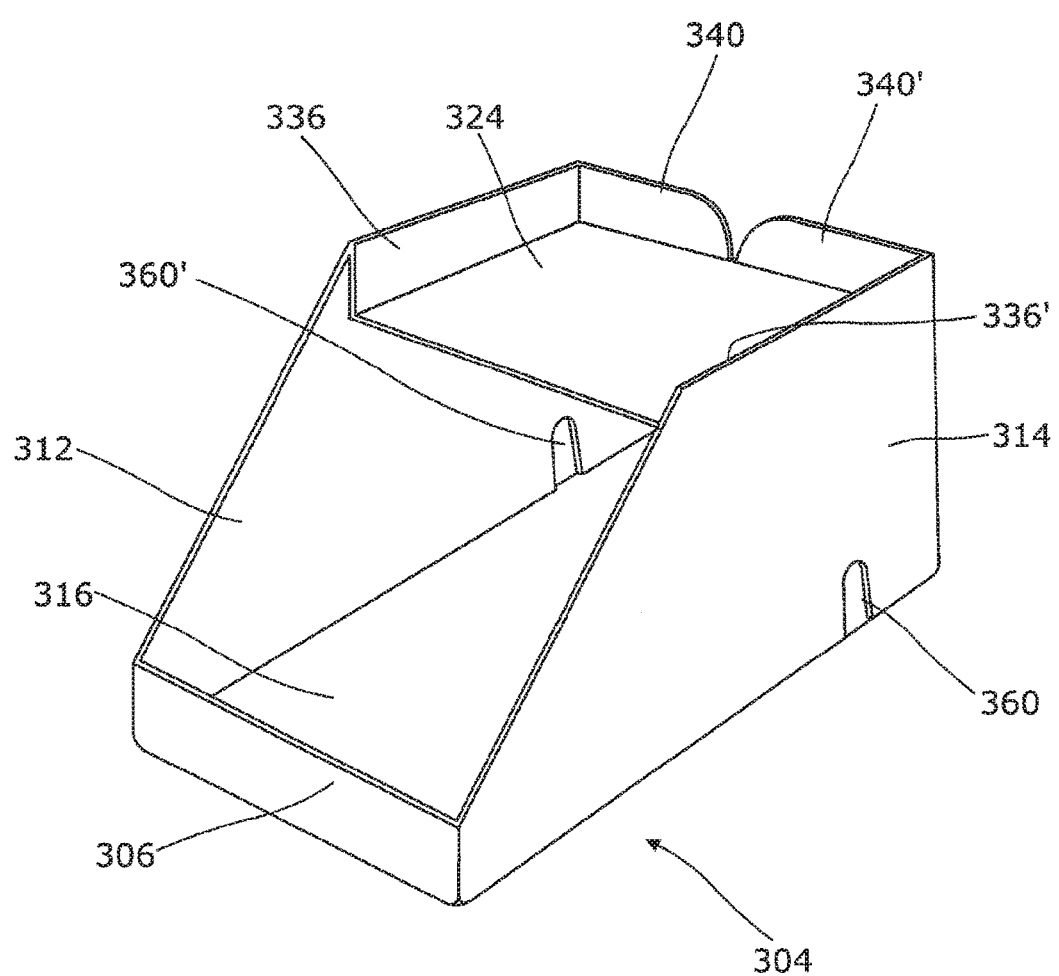
FIG. 10 is a perspective view of the container of FIG. 9 in an open configuration.

In use, the cover (322) is removed by a user inserting his or her fingers into the slot (370) in the front wall (350), and tearing the cover (322) away from the base (304) via the perforation lines (352, 352'). The upper surface of the cover (350') extends only part way along the upper surface of the container, to join the upper surface (324) of the base (304). Therefore, when the cover (322) is removed, the base retains the upper surface (324), which forms the upper surface of the open container (302). This configuration is shown in FIG. 10, in which the container is in an open position with the cover fully removed. In this configuration, the upper surface (324) of the base (304) retains a portion of its upwardly extending flaps (336, 336', 340, 340'). The embodiment of the container (302) shown in FIGS. 9 and 10 may be used in at least two ways.

Figure 11:
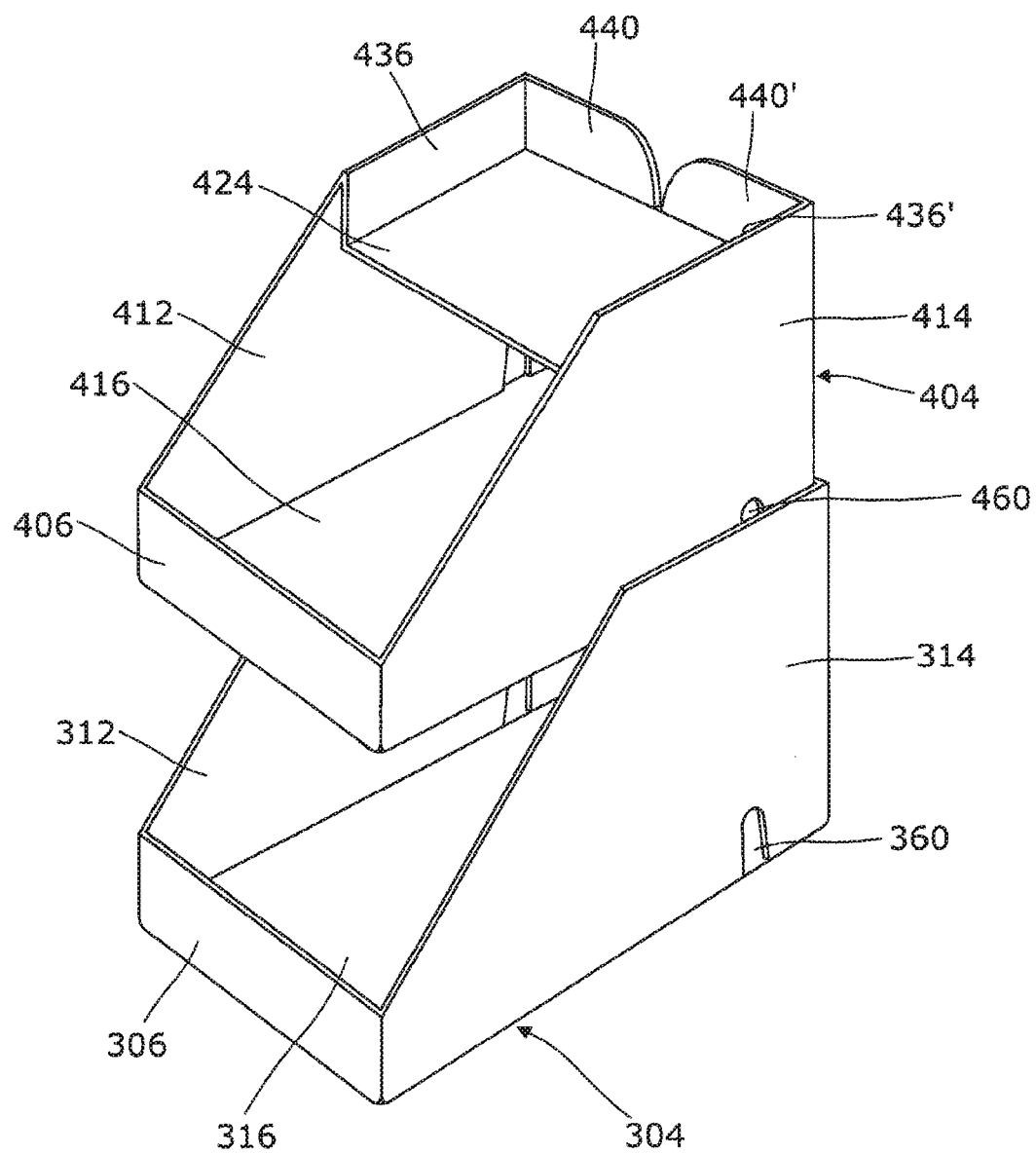
FIG. 11 is a perspective view of two bases of the container of FIG. 10, stacked to form a display.

FIG. 11 illustrates a first configuration of a stack of two containers (302). In the configuration shown in FIG. 11, a first base (304) is provided with the cover (322) fully removed.

A second base (404) including front wall (406) base (416) left and right side walls (412, 414), upper surface (424) and cut-out slots (460) located extending from the bottom of left and right side walls (412, 414). The upper surface (424) of the second base (404) also includes upwardly extending flaps (436, 436', 440 and 440'), which components are identical to those of the first base (304). The second base is mounted securely on the upper surface (324) of the first base (304) such that the left and right side walls (412, 414) are located within the left and right side walls (312, 314) of the first base (304), and the front wall (406) of the second base (404) overhangs the interior of the first base (304) formed by the removal of the first cover (324). In this configuration, items located within each base (304, 404) are visible, and can removed by a user. Further bases may be stacked on top of the stacked shown in FIG. 11 by repeating the removal of a cover of each further base, and mounting of each further base on the upper surface of the preceding base as described above.

Figure 12:
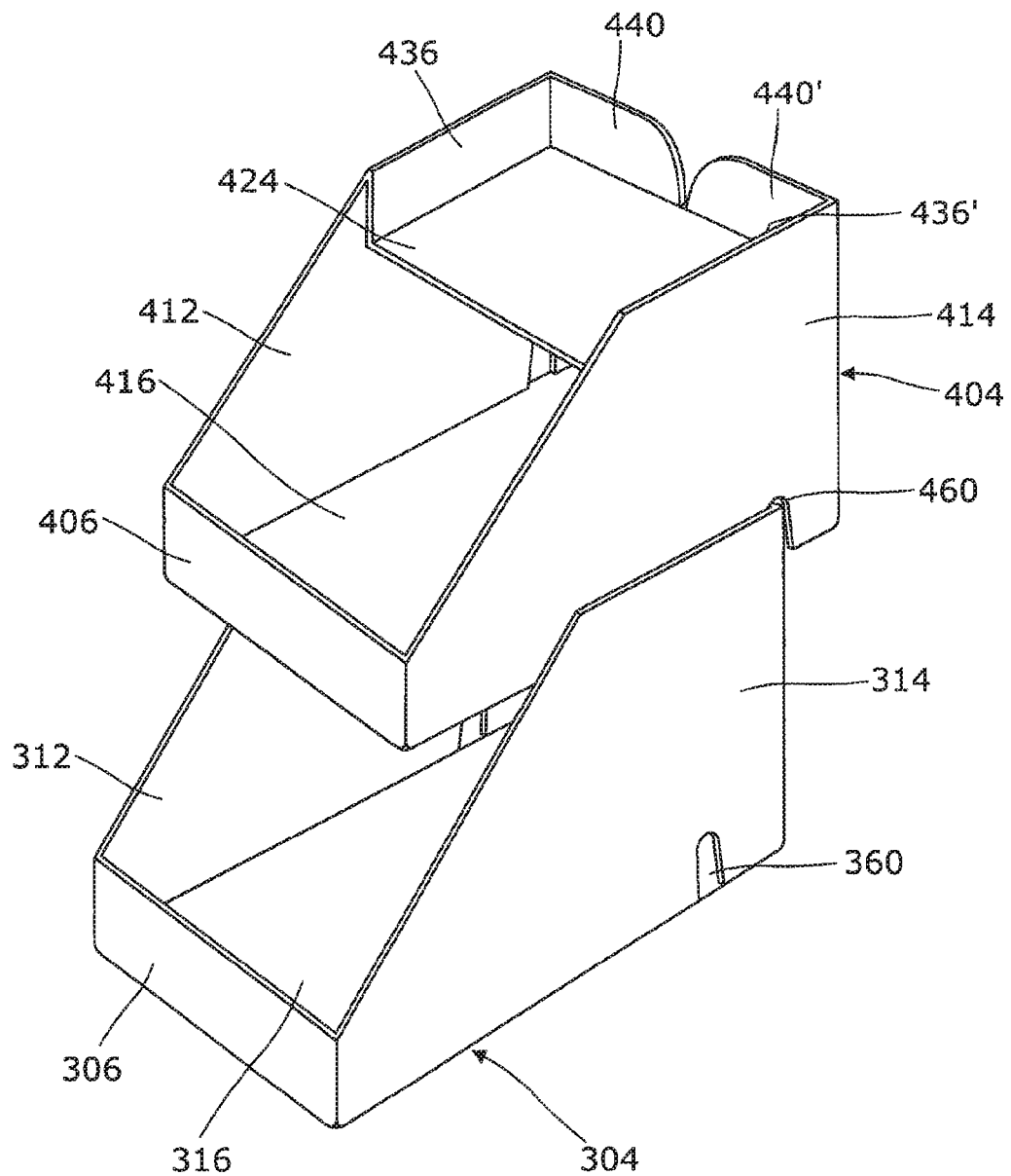
FIG. 12 is a perspective view of two bases of the container of FIG. 10, stacked off-set with respect to each other, to form a display.

FIG. 12 shows an alternative configuration of a stack of two bases (304, 404) to that shown in FIG. 11. In this configuration, the second base (404) is secured offset with respect to the first base (304), such that the rear of the second base (404) overhangs and extends from the rear of the first base (304). This is achieved by coupling the cut-out slots (460) at the bottom of the left and right side walls (412, 414) of the second base (404), with the upwardly extending flaps (340, 340') of the lower base (304). In this configuration the front wall (406) of the upper base (404) is offset rearwardly of the front wall (306) of the lower base (304), thereby giving more visibility and room to remove an item located within the interior of the lower base (304). Further bases may be mounted offset on the stack of two bases in a similar manner.

Figure 13:
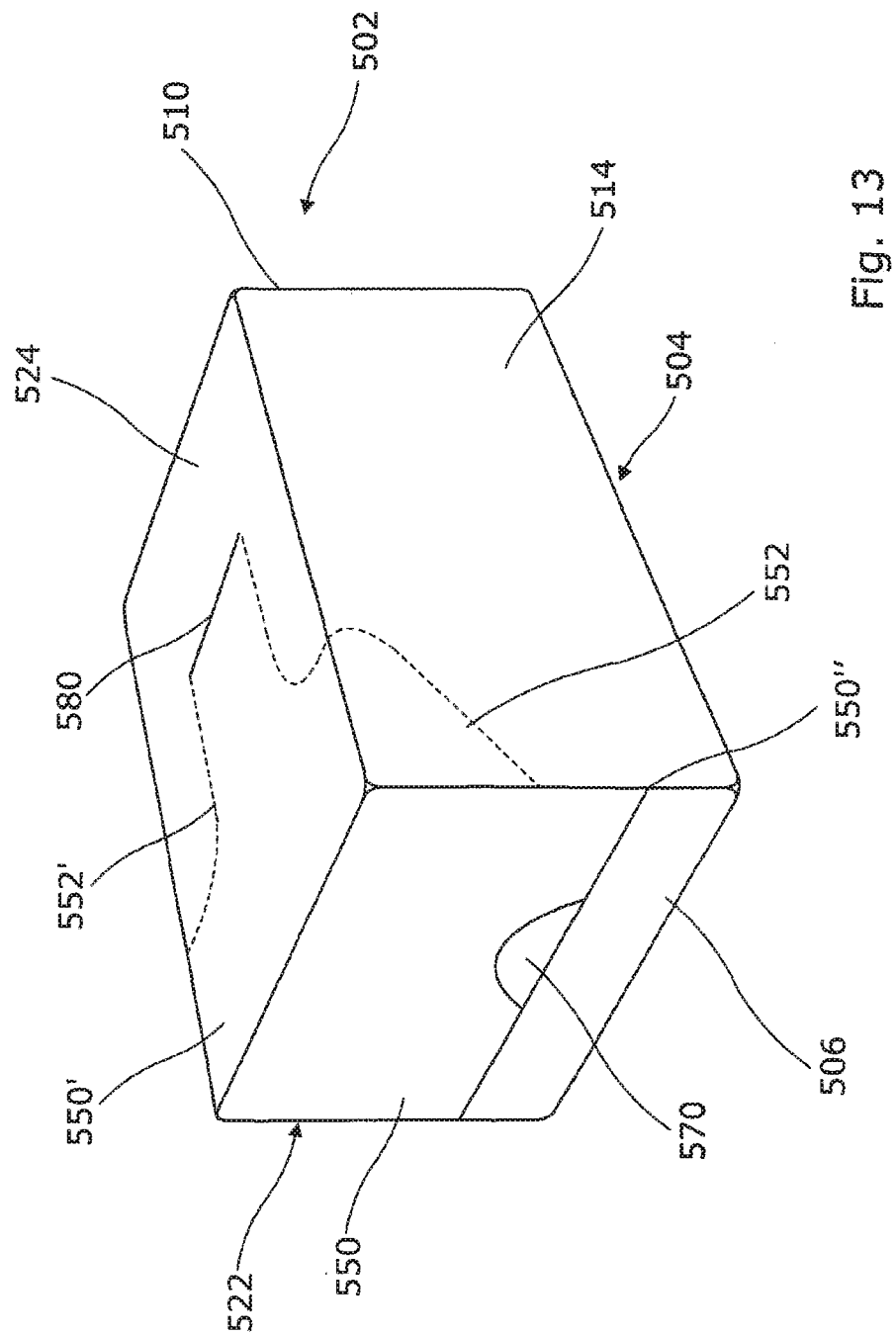
FIG. 13 is a perspective view of a fourth embodiment of a container in a closed configuration.
Figure 14:
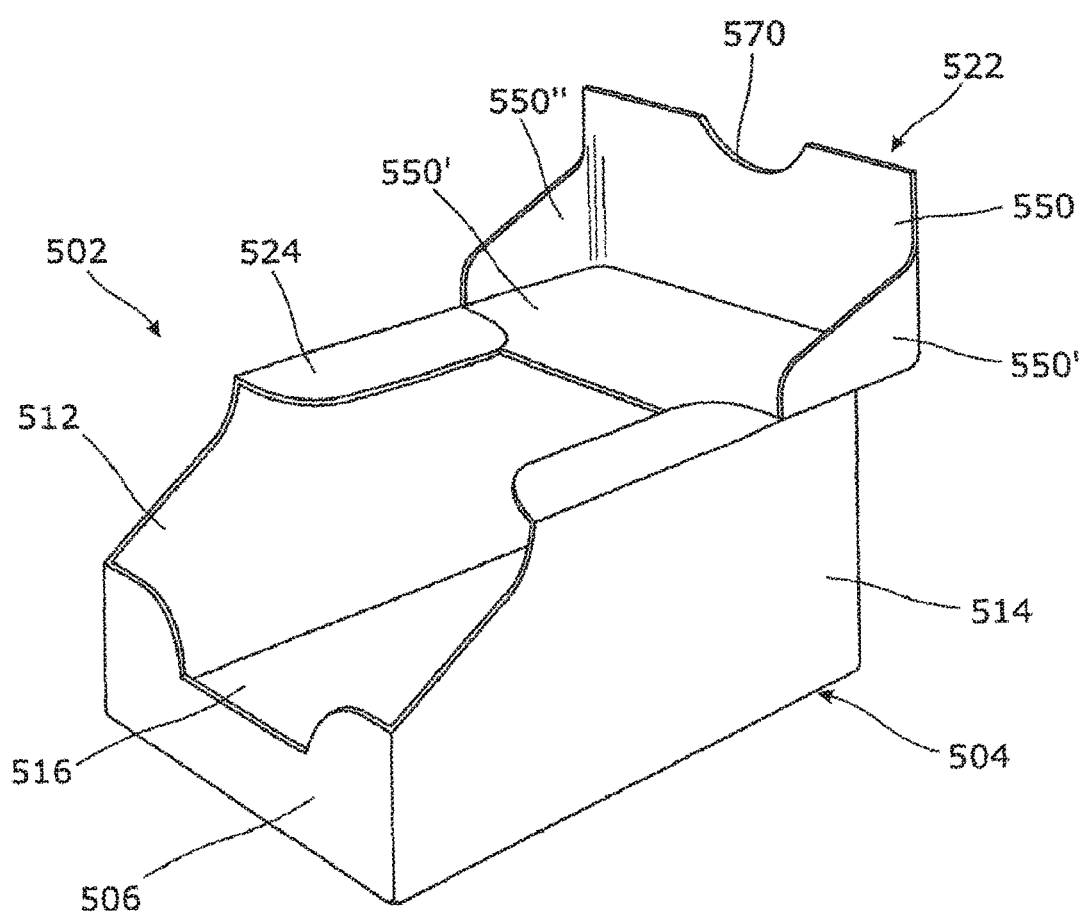
FIG. 14 is a perspective view of the container of FIG. 13 in an open configuration.
Figure 15:
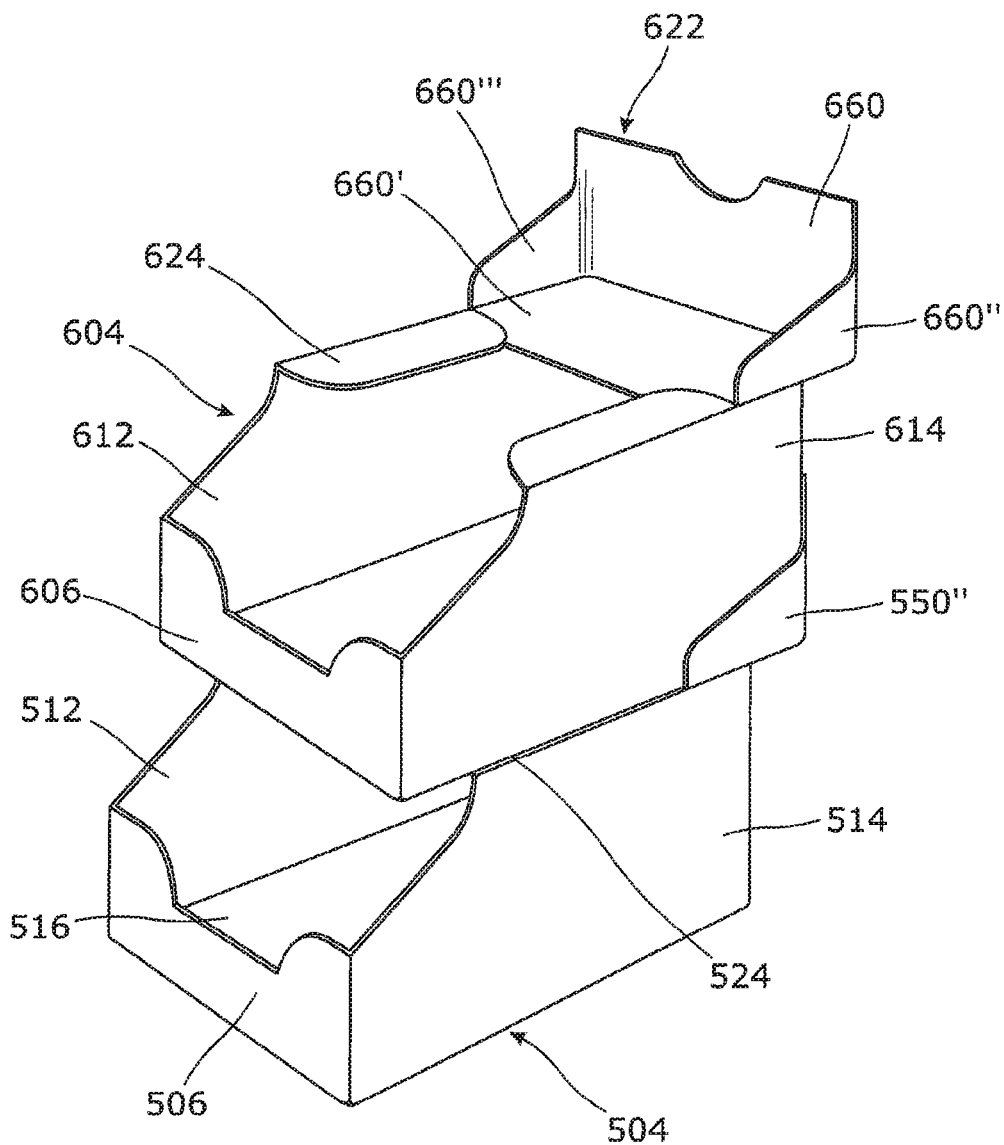
FIG. 15 is a perspective view of two containers of FIG. 13, stacked to form a display.

We refer now to FIGS. 13-15, which illustrate a fourth embodiment of a container of the invention and its use in creating a display of stacked containers. The container (502) of the embodiment shown in FIGS. 13-15 includes a base (504) having front (506), left (512), right (514) and rear (510) walls, as well as an upper surface (524). The base (504) is formed with an integral cover (522) which includes a front wall (550), upper surface (550') and left and right side walls (550") connected to the base (504) via perforations (552, 552'). The perforations extend from the junction between the side walls of the cover and base, and the upper surfaces of the cover and base, cumulating in a hinge (580) located at the junction between the upper surface (524) of the base (504), and the upper surface (550') of the cover (522). In this way, the cover can be torn from the base via the perforations (552, 552') and rotated about the hinge (580). The front wall (550) of the cover (522) includes a cut-out slot (570) to enable a user to insert his or her fingers into the container (502) in order to initiate tearing of the perforations (552, 552').

In use, a user moves the cover (522) from a closed position to an open position in which an item located in the base (504) is visible and removable by the user, by inserting his or her finger into the slot (570), and ripping and rotating the cover (522) about the perforations (552, 552') and the hinge (580). The cover (522) is rotated until the upper surface (550') has been rotated substantially 180°, until it rests on a portion of the upper surface (524) of the base (504), as shown in FIG. 14. In this configuration, the front wall (550) and side walls (550, 550". 550''') extend upwardly from the base (504) and the inner surface of the upper surface (550') of the cover (522). This creates a securement area defined by the walls of the cover (550, 550', 550", 550''') onto which a second base may be secured. As shown in FIG. 15, a second base (614) may then be secured to the cover (522) of the first container (502) to create a display of stacked containers. The second base (614) may have previously been configured such that its cover (622) has been moved from the closed to the open position by rotating the cover (622) about its hinge (680) as described herein above for the first container (502). This configuration is shown in FIG. 15. In FIG. 15, it can be seen that due to the fact that the first cover (522) extends rearwardly from the upper surface (524) of the base (504), the secured second base (614) also extends rearwardly with respect to the first base (504), such that its front wall (606) is offset from the front wall (506) of the first base (504). In this way, it is easier for a user to view and remove an item from both the first base (504) and the second base (604).

We turn now to FIGS. 16 to 19 which illustrate a fifth embodiment of a container and display. The container (702) includes a base (704) and a cover (722). The base (704) includes a front wall (710), rear wall (726), left and right side walls (712, 714) and a bottom (716). The left and right side walls (712, 714) include upwardly extending fins (794, 794') which, in the closed container (702) are located within and abutting the interior of the cover (722). The bottom edge of the left and right side wall (712, 714) of the base (704) include cut out slots (790) which define an aperture (792) approximately midway between the front (726) and rear (710) walls.

Figure 16:
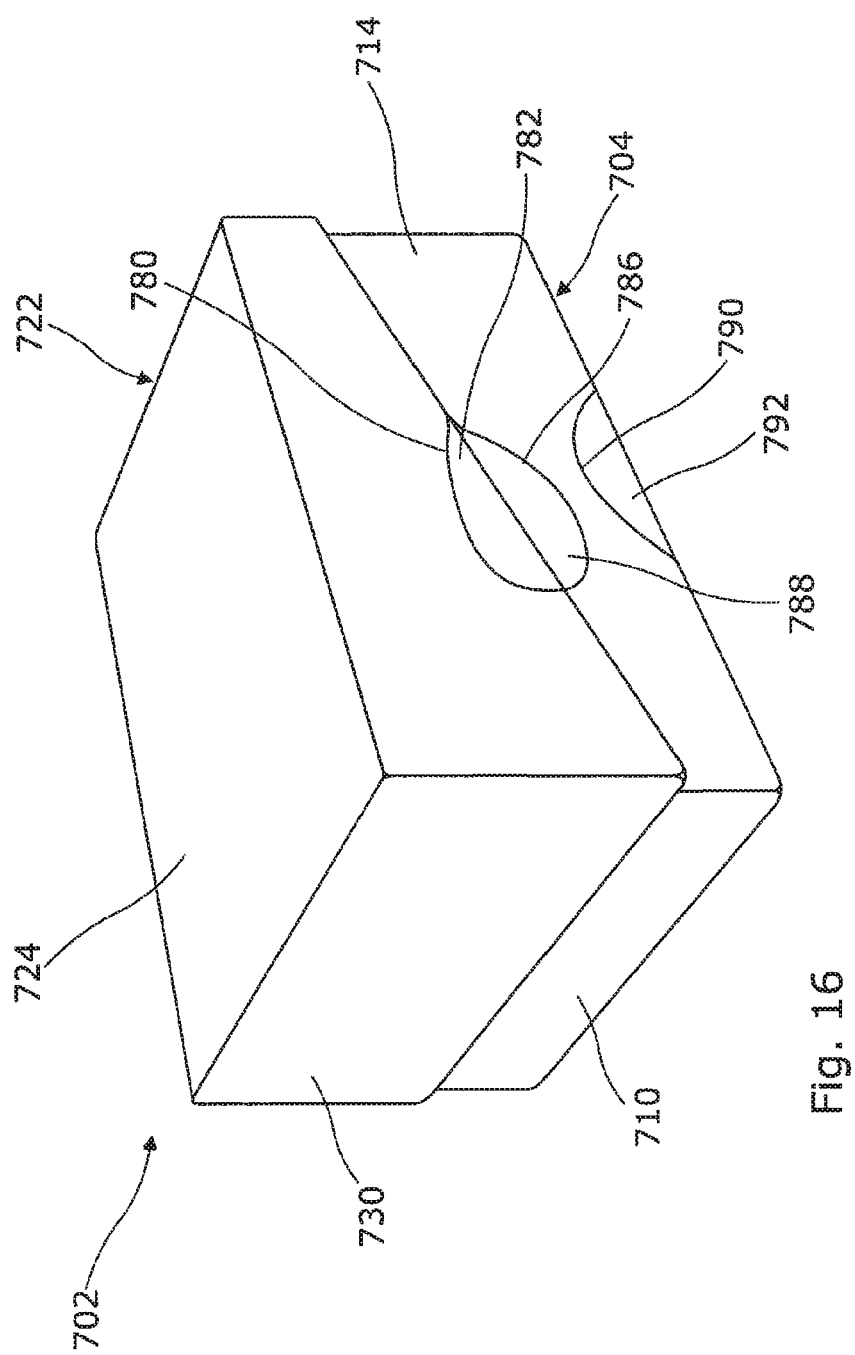
FIG. 16 is a perspective view of a fifth embodiment of a container in a closed configuration.

The cover (722) includes front wall (726), rear wall (730), left and right side wall (732, 734) and an upper surface (724). Extending from the front wall (726) is a flap (727) so the user may grasp the flap (727) in order to manipulate the cover in use. Extending from the left and right side wall (732, 734) are flaps (782, 782'). The flaps (782, 782') are arranged to fit into the cut outs slots (790) at the bottom of the side walls (712, 714) of a base (704), in use. The container (702) in the closed configuration includes a base (704) completely covered by the cover (722), and with the flaps (782, 782') of the cover (722) extending within the region around the slots (786) of the base (704). Likewise, the protruding flaps (794, 794') extend within the interior of the container (702), in the region of the slots (780) of the cover (722), as shown in FIG. 16.

Figure 17:
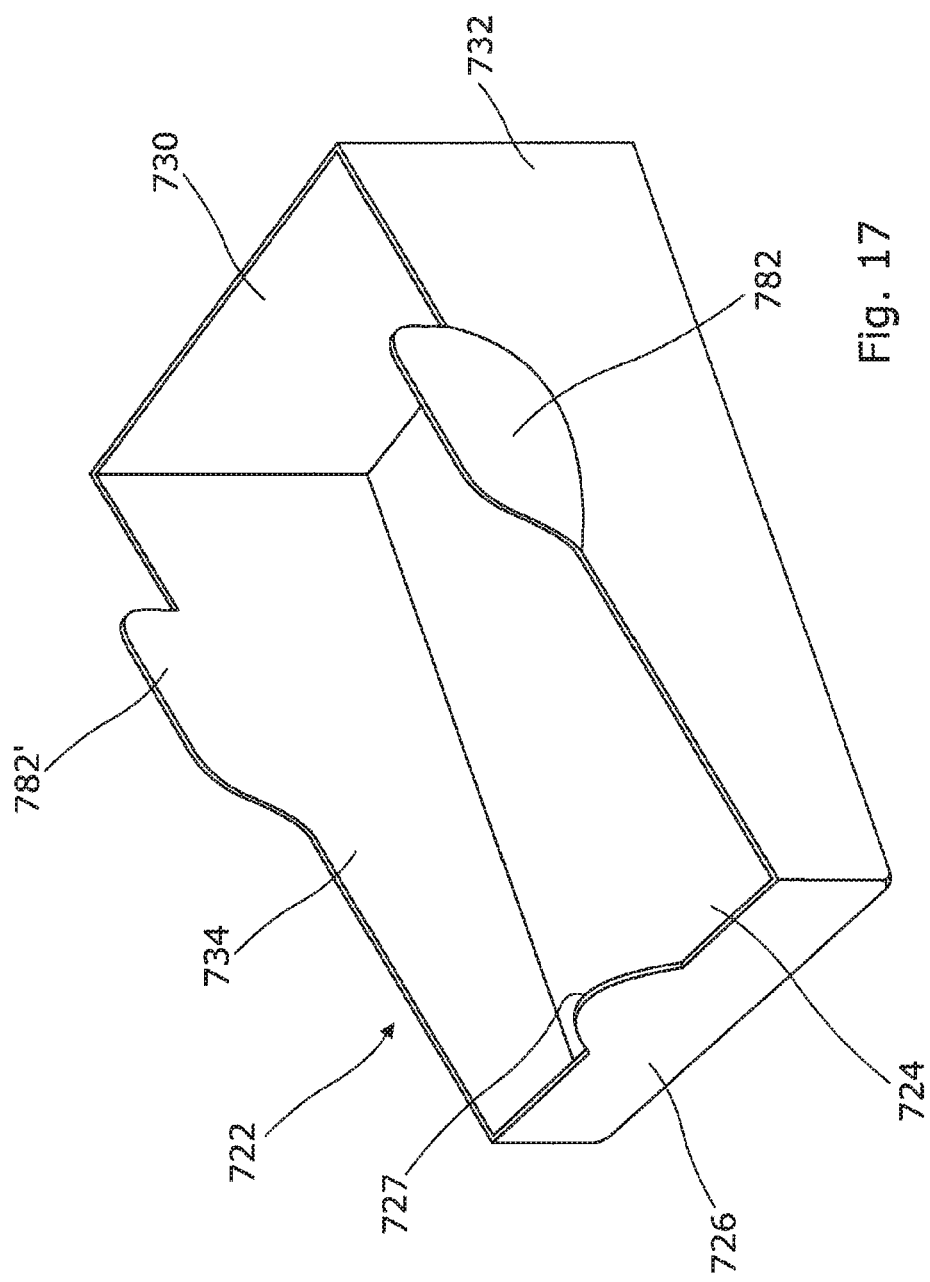
FIG. 17 is a perspective view of an upturned cover of the container of FIG. 16.
Figure 18:
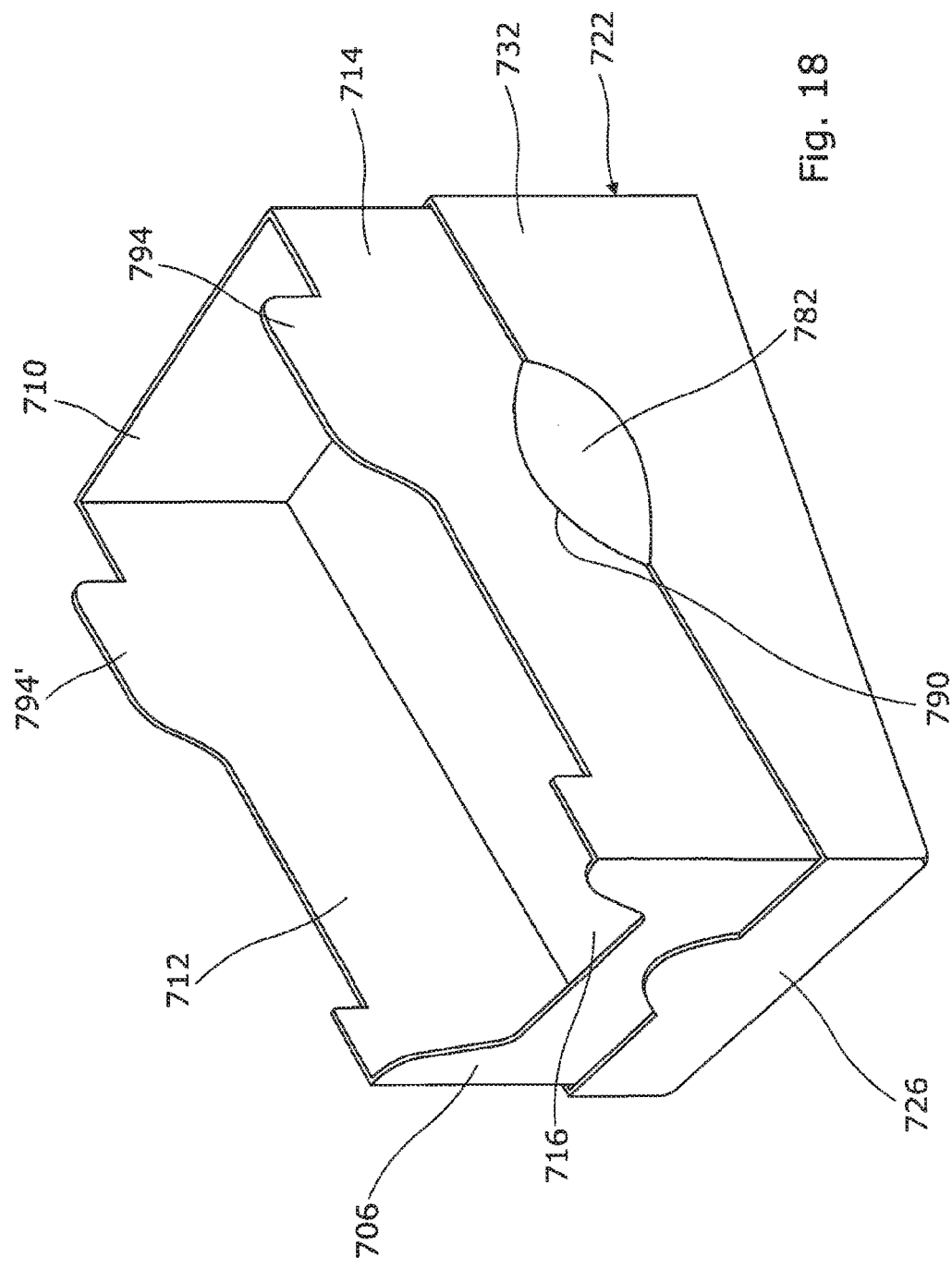
FIG. 18 is a perspective view of the base of the container of FIG. 16 stacked on the up-turned cover of FIG. 17.

In use, the cover (722) is removed from the base (704) and the cover upturned and rested on a surface as shown in FIG. 17. In this configuration the flaps (782, 782') are extending upwardly from the walls (732, 734) of the cover (722). The base (704) is then securely mounted on the upturned cover (722) which is shown in FIG. 18, by aligning the flaps (782, 782') of the cover (722) with the cut out slots (790) of the base, such that the flaps (782, 782') enter the cut out slots (790), to secure the base (704) on the cover (722). In this configuration, the interior of the base (704) is open, and items located in the base (704) are visible removable by user. The base is inclined at an angle to the surface that the cover (722) rests upon due to the fact that the front wall (726) and rear wall (730) of the cover are of unequal heights, which ensures that the side walls (732, 734) provide an inclined angle onto which the base (704) is securely mounted; resulting in the base (704) inclining forwardly from the surface on which the cover (722) is mounted.

Figure 19:
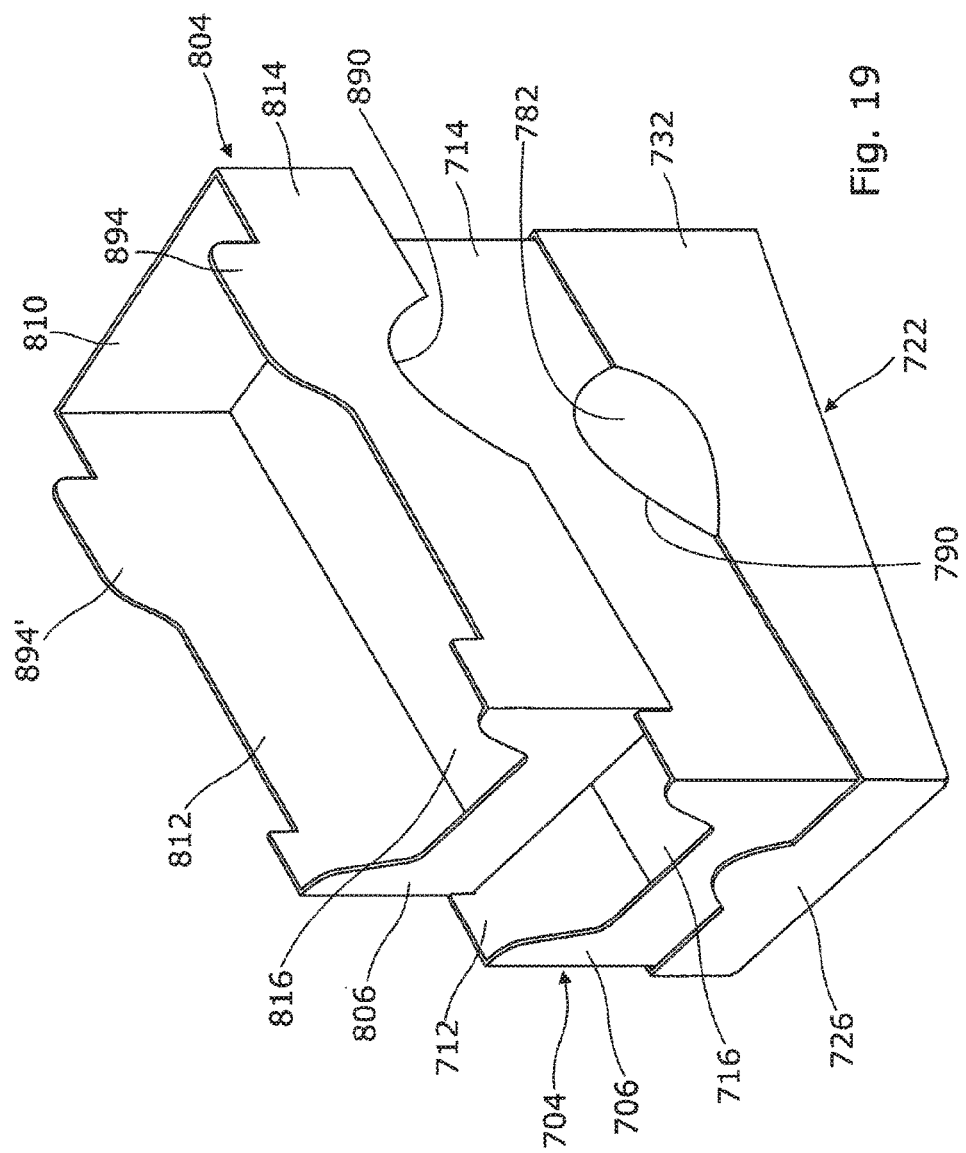
FIG. 19 is a perspective view of a second base mounted on the stack of FIG. 18.
Figure 20:
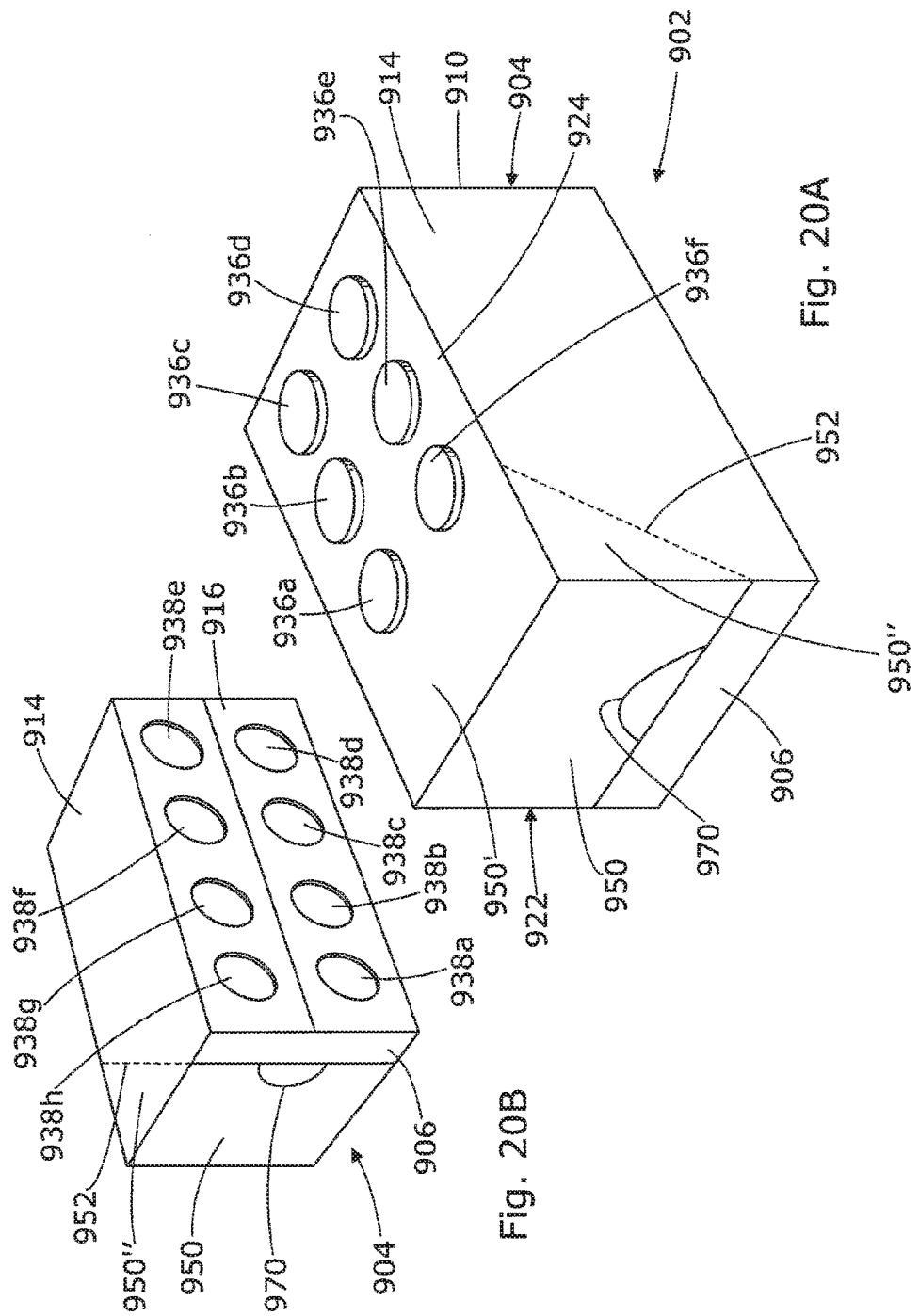
FIG. 20A is a perspective view from the above of a sixth embodiment of a container.
FIG. 20B is a perspective view from below of the container of FIG. 20A

As shown in FIG. 19 a second base (804) maybe mounted on the first base (704), in a similar manner to the mounting of the first base (704) to the cover (722). The upwardly pending flaps (794, 794') are arranged to cooperate with the slots (890) in the bottom of the side walls (912, 914) of the second base (804), in order to securely mount the second base (804) to the first base (704). As the flaps (794, 794') are located rearwardly on the side walls (712, 714), the second base (804) is mounted offset from the first base (704), such that the rear wall (810) of the second base (804) extends rearwardly from the first base (704) this configuration is shown in FIG. 19, where it can be seen in this configuration items located in the first base (704) are visible and removable from the first base (704), due to the offset location of the second base (804). Further bases may be connected in a similar manner to increase the stack height.

We refer now to FIGS. 20A-22, which illustrate a sixth embodiment of a container and display. The container (902) is similar to that described for the embodiments shown in FIGS. 9-12. The container (902) includes a base (904) with a front wall (906), rear wall (910) and left and right side walls (912, 914) and upper surface (924) extending from the rear wall (910) part way along the left and right walls (912, 914). The container (902) includes an integral cover (922) including a front wall (950), upper surface (950') and left and right side walls (950"), which, in the container's closed position completely covers the interior of the base (904). The front wall (950) of the cover (922) includes a cut out slot (970) for a user to insert his or her fingers in order to enable to removal of the cover (922) in use. The cover is connected to the base (904) via perforations (952) and maybe completely removed via the perforations.

The upper surface (924) of the base (904) includes six circular bosses protruding upwardly therefrom (936A-936F). Conversely, the cover includes six circular cut out portions on the upper surface (950') corresponding in size to the bosses (936A-936F) of the upper surface (924) of the base (902). The cover is oriented on the base (902) such that the circular cut outs of the cover (922) are in register with the bosses (936A-936F) of the base (902), such that the bosses protrude therefrom.

The base (902), on its bottom surface (916) includes 8 cut-out circular portions (938A-938H) as shown in FIG. 20B. The circular cut-out portions (938A-938H) are oriented such that when a second base is mounted on the upper surface (924) of the first base (902), 6 of the circular cut-out portions (938A-938H) can be oriented in register with the protruding bosses (936A-936F) of the lower base (904).

Figure 21:
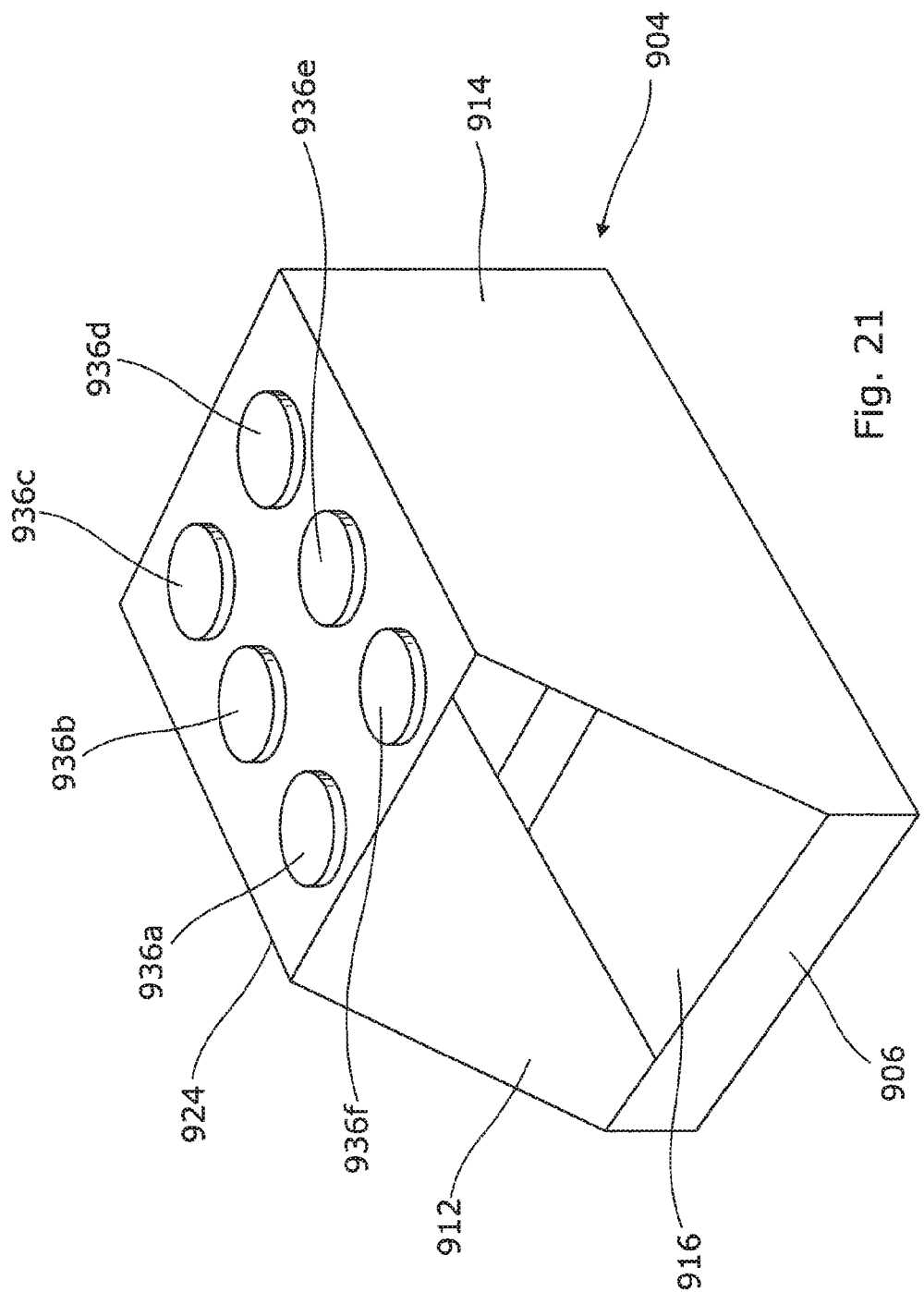
FIG. 21 is a perspective view of the container of FIG. 20A with the cover removed.

In use, a user removes the cover (922) as shown in FIG. 21, in order to create a container in which the base (904) is in an open position where a user may view and remove items from the interior of the (904), as shown in FIG. 21. In this configuration, the upper surface (924) of the base (904) is free from the cover (922), and the bosses (936A-936F) protruding therefrom are able to receive cut-out portions (938A-938H) of a second base.

Figure 22:
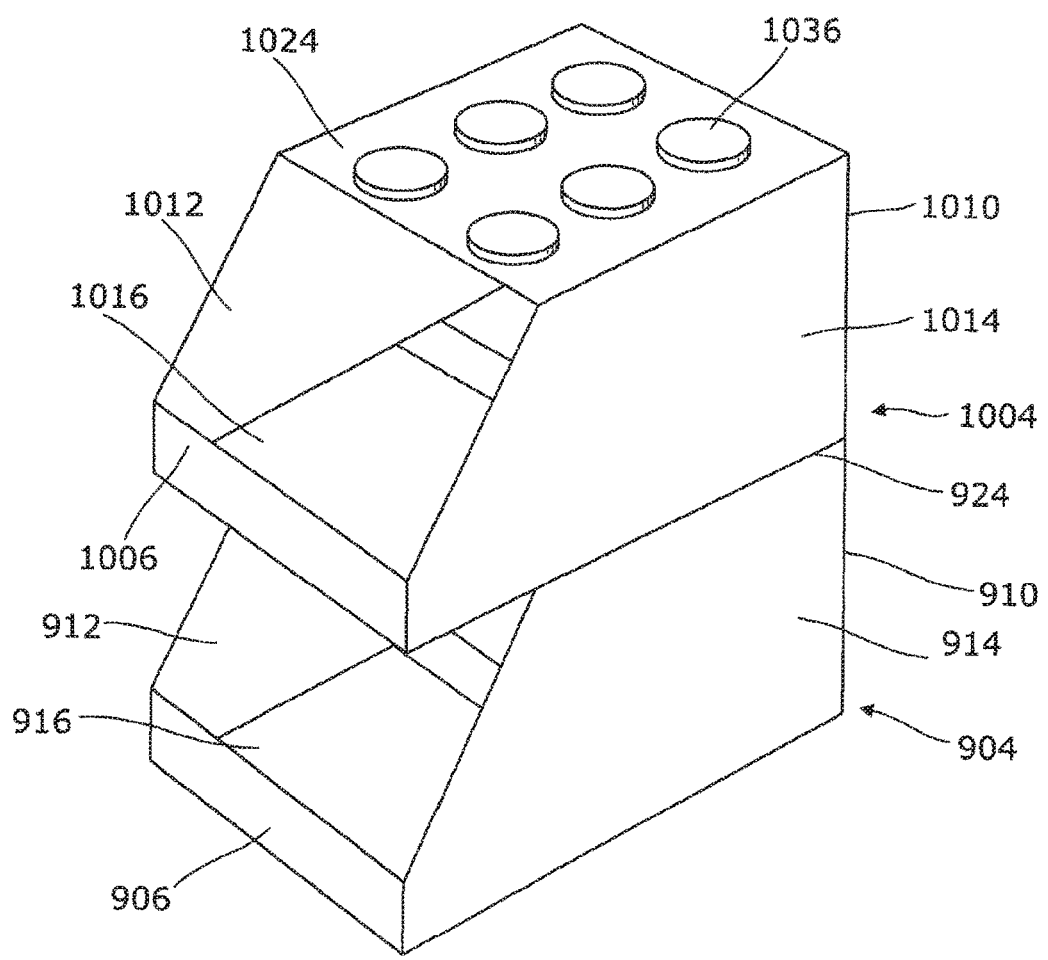
FIG. 22 is a perspective view of the container of FIG. 21 with a second base mounted thereon.

FIG. 22 illustrates a configuration in which a second base (1004) has been securely mounted to the upper surface (924) of a first base (904), via 6 of the respective cut-out portions (938A-938H) of a second, upper base (1004) cooperating with the protruding bosses (936A-936F) of the lower base (904). As shown in FIG. 21, in this configuration a user may review and remove items from the interior of both the lower base (904) and the upper base (1004). In an alternative configuration, the upper base (1004) may be offset rearwardly when connecting it to the lower base (904), by utilising a different set of cut-out portions (938A-938H), such that the rear wall (1010) of the upper base (1004) protrudes and extends rearwardly from the rear wall (910) of the lower base (904), in a similar manner to the embodiments shown in FIGS. 15 and 19 for example. In this configuration, the offset nature of the upper base (104) means that the front wall (1006) of the upper base (1004) is offset rearwardly with respect to the front wall (906) of the lower base (904), thereby creating a bigger gap through which a user may insert his or her hand to get to the interior of the lower base (904).

In other embodiments, not shown, the various means to secure the various bases and covers together in the open configurations may be changed to any suitable securement means such as different interlocking or fastening elements for example.

The above embodiments are described by way of example only. Many variations are possible without departing from the scope of the invention as defined in the appended claims.

The invention claimed is:

1. A container comprising:
    a base for storing and displaying one or more items; and
    a cover that is positionable on said base in a position in which at least one item is visible and removable from the base,
    wherein at least one wall of the base or cover includes at least one cut-out portion or slot that is arranged to receive a continuous edge of at least one wall of the other of the cover or base, and
    wherein the cover overhangs or protrudes from the base when the cover is in the position and the continuous edge of the at least one wall of the cover or the base is received in the at least one cut-out portion or slot.

2. The container of claim 1, wherein the at least one wall including the at least one cut out portion or slot is at least one base wall, and the continuous edge is a continuous cover edge of at least one cover wall.

3. The container of claim 2, wherein the base includes two relatively long base walls and two relatively short base walls,
    wherein the cover includes two relatively long cover walls and two relatively short cover walls,
    wherein the continuous cover edge of the at least one cover wall is located on one of the two relatively short cover walls, and
    wherein the at least one base wall including the at least one cut out portion or slot is the two relatively long base walls.

4. A set of containers comprising:
    a first container for storing and displaying one or more items; and
    a second container for storing and displaying one or more items, the second container being positionable on said first container in a position in which at least one item is visible and removable from the first container,
    wherein at least one wall of the first container or second container includes at least one cut out or slot arranged to receive at least one wall of the other of the first container or the second container, and
    wherein the second container overhangs or protrudes from the first container when the second container is in the position.

* * * * *